(12) United States Patent
Vinson et al.

(10) Patent No.: US 11,926,089 B2
(45) Date of Patent: *Mar. 12, 2024

(54) APPARATUS FOR INSTALLING A SCREEN PROTECTOR ON AN ELECTRONIC DEVICE

(71) Applicant: Otter Products, LLC, Fort Collins, CO (US)

(72) Inventors: Richard W. Vinson, Fort Collins, CO (US); Zachariah J. Pickett, Fort Collins, CO (US); John P. Fitzgerald, Fort Collins, CO (US); Douglas A. Kempel, Fort Collins, CO (US); Jamie L. Johnson, Fort Collins, CO (US); Ross V. Bulkley, Loveland, CO (US); Adam J. Havens, Fort Collins, CO (US); Grady E. Barfoot, Denver, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,965

(22) Filed: May 9, 2023

(65) Prior Publication Data

US 2023/0271376 A1 Aug. 31, 2023

Related U.S. Application Data

(63) Continuation of application No. 17/506,835, filed on Oct. 21, 2021, now Pat. No. 11,685,106, which is a
(Continued)

(51) Int. Cl.
*B29C 63/00* (2006.01)
*G02B 1/14* (2015.01)

(52) U.S. Cl.
CPC ............ *B29C 63/0004* (2013.01); *G02B 1/14* (2015.01); *B29C 2063/0008* (2013.01)

(58) Field of Classification Search
CPC . B29C 63/00; B29C 63/0004; B29C 63/0047; B29C 63/0056; B29C 63/0095;
(Continued)

(56) References Cited

U.S. PATENT DOCUMENTS 2,908,986 A 10/1959 Adolf
4,547,255 A 10/1985 Yow
(Continued)

FOREIGN PATENT DOCUMENTS

CA 2449951 A1 5/2005
CA 2606441 A1 11/2006
(Continued)

OTHER PUBLICATIONS

"Bodyguardz", Product Packaging, 2006, NLU Products, LLC, Draper, Utah.
(Continued)

*Primary Examiner* — John L Goff, II

(57) ABSTRACT

An apparatus is provided for assisting in affixing a screen protector to a display of an electronic device. The apparatus includes a base including a platform configured to support the electronic device. The apparatus includes a lid configured to cover at least a portion of the base and the supported electronic device. The lid includes an aperture.

19 Claims, 25 Drawing Sheets

Related U.S. Application Data continuation of application No. 16/985,933, filed on Aug. 5, 2020, now Pat. No. 11,186,031.

(60) Provisional application No. 62/885,381, filed on Aug. 12, 2019.

(58) Field of Classification Search
CPC .............. B29C 63/02; B29C 63/024; B29C 2063/0008; B29C 65/7802; B29C 65/7835; B29C 66/342; B29C 66/8362; G02B 1/14
See application file for complete search history.

(56) References Cited

U.S. PATENT DOCUMENTS

| | | |
|---|---|---|
| 4,873,270 A | 10/1989 | Aime et al. |
| 5,083,979 A | 1/1992 | Burt |
| 5,132,588 A | 7/1992 | Warman |
| 5,388,691 A | 2/1995 | White |
| 5,484,168 A | 1/1996 | Chigot |
| 5,499,713 A | 3/1996 | Huffer |
| 5,514,730 A | 5/1996 | Mazurek et al. |
| RE35,318 E | 8/1996 | Warman |
| 5,548,306 A | 8/1996 | Yates et al. |
| 5,732,414 A | 3/1998 | Monica |
| 5,965,256 A | 10/1999 | Barrera |
| 6,017,079 A | 1/2000 | Warner |
| 6,054,009 A | 4/2000 | Cote et al. |
| 6,227,599 B1 | 5/2001 | Campfield et al. |
| 6,406,758 B1 | 6/2002 | Bottari et al. |
| 6,415,138 B2 | 7/2002 | Sirola et al. |
| 6,491,775 B1 | 12/2002 | Janssen et al. |
| 6,514,624 B2 | 2/2003 | Takemoto |
| 6,614,423 B1 | 9/2003 | Wong et al. |
| 6,800,378 B2 | 10/2004 | Hawa et al. |
| 6,941,056 B2 | 9/2005 | Hirota |
| 7,054,441 B2 | 5/2006 | Pletikosa |
| 7,151,532 B2 | 12/2006 | Schulz |
| 7,158,376 B2 | 1/2007 | Richardson et al. |
| 7,180,735 B2 | 2/2007 | Thomas et al. |
| 7,194,086 B2 | 3/2007 | Pletikosa |
| 7,214,432 B2 | 5/2007 | Merfeld et al. |
| 7,290,654 B2 | 11/2007 | Hodges |
| 7,351,470 B2 | 4/2008 | Draheim et al. |
| 7,389,869 B2 | 6/2008 | Mason, Jr. |
| 7,400,917 B2 | 7/2008 | Wood et al. |
| 7,413,787 B2 | 8/2008 | Vetrovec et al. |
| 7,529,364 B2 | 5/2009 | Buehler |
| 7,743,929 B2 | 6/2010 | Kools |
| 7,784,610 B2 | 8/2010 | Mason |
| 7,799,853 B2 | 9/2010 | Ukei et al. |
| 7,803,292 B2 | 9/2010 | Heki |
| 7,957,524 B2 | 6/2011 | Chipping |
| 7,993,482 B2 | 8/2011 | Begon et al. |
| 8,128,779 B2 | 3/2012 | Ho et al. |
| 8,326,383 B1 | 12/2012 | Patel et al. |
| D676,031 S | 2/2013 | Melville et al. |
| 8,369,072 B1 | 2/2013 | Alonzo et al. |
| 8,393,377 B2 | 3/2013 | Patel et al. |
| 8,517,367 B1 | 8/2013 | Napier |
| 8,564,538 B2 | 10/2013 | Wadsworth |
| 8,567,596 B1 | 10/2013 | Mason, Jr. |
| 8,640,759 B2 | 2/2014 | Chen |
| D705,206 S | 5/2014 | Gengler et al. |
| 8,940,122 B2 | 1/2015 | Cohen et al. |
| 8,944,425 B2 | 2/2015 | Napier |
| 9,192,086 B2 | 11/2015 | Hsu et al. |
| D746,265 S | 12/2015 | Colby et al. |
| 9,254,629 B2 | 2/2016 | Napier |
| D751,556 S | 3/2016 | Conley et al. |
| D751,557 S | 3/2016 | Lane |
| D759,640 S | 6/2016 | Wadsworth |
| D767,550 S | 9/2016 | Beaupre et al. |
| 9,580,626 B2 | 2/2017 | Colby et al. |
| D781,861 S | 3/2017 | Lane et al. |
| 9,588,547 B2 | 3/2017 | Witham et al. |
| D783,024 S | 4/2017 | Conley et al. |
| 9,641,209 B2 | 5/2017 | Roberts et al. |
| 9,662,860 B2 | 5/2017 | Wadsworth |
| 9,701,062 B2 | 7/2017 | Wadsworth et al. |
| 9,701,096 B2 | 7/2017 | Beaupre |
| 9,757,934 B2 | 9/2017 | Wadsworth |
| D800,126 S | 10/2017 | Wadsworth et al. |
| D800,127 S | 10/2017 | Beaupre et al. |
| D800,128 S | 10/2017 | Beaupre et al. |
| D800,129 S | 10/2017 | Wadsworth et al. |
| D800,130 S | 10/2017 | Beaupre et al. |
| D800,131 S | 10/2017 | Wadsworth et al. |
| 9,777,195 B2 | 10/2017 | Colby et al. |
| D802,594 S | 11/2017 | Beaupre et al. |
| D811,404 S | 2/2018 | Wadsworth |
| D811,405 S | 2/2018 | Wadsworth et al. |
| D811,406 S | 2/2018 | MacDonald et al. |
| D811,407 S | 2/2018 | Wadsworth et al. |
| D811,408 S | 2/2018 | Wadsworth et al. |
| 9,902,111 B2 | 2/2018 | Wadsworth et al. |
| D812,061 S | 3/2018 | MacDonald et al. |
| D812,062 S | 3/2018 | MacDonald et al. |
| D812,063 S | 3/2018 | Lane et al. |
| D817,945 S | 5/2018 | Wadsworth et al. |
| D821,384 S | 6/2018 | Jordin et al. |
| 10,009,057 B2 | 6/2018 | Chaves et al. |
| 10,065,365 B2 | 9/2018 | Lane |
| 10,076,872 B2 | 9/2018 | Witham et al. |
| 10,155,370 B2 | 12/2018 | Wadsworth |
| 10,710,294 B1 | 7/2020 | Sorensen et al. |
| 10,841,409 B2 | 11/2020 | Bulkley et al. |
| 11,186,031 B2 | 11/2021 | Vinson et al. |
| 11,685,106 B2 * | 6/2023 | Vinson .................. B29C 63/02 156/391 |
| 2002/0195910 A1 | 12/2002 | Hus et al. |
| 2003/0080947 A1 | 5/2003 | Genest et al. |
| 2003/0110613 A1 | 6/2003 | Ross |
| 2004/0205351 A1 | 10/2004 | Koide et al. |
| 2004/0237433 A1 | 12/2004 | Smith |
| 2004/0243686 A1 | 12/2004 | Schilders |
| 2005/0007000 A1 | 1/2005 | Chou et al. |
| 2005/0022924 A1 | 2/2005 | Blackburn |
| 2005/0047589 A1 | 3/2005 | Chang |
| 2005/0279661 A1 | 12/2005 | Hodges |
| 2006/0019113 A1 | 1/2006 | Sparks et al. |
| 2006/0022309 A1 | 2/2006 | Tokunaga et al. |
| 2006/0024263 A1 | 2/2006 | Es et al. |
| 2006/0134406 A1 | 6/2006 | Horigome et al. |
| 2006/0158592 A1 | 7/2006 | Freking et al. |
| 2006/0262405 A1 | 11/2006 | Brumwell |
| 2007/0115387 A1 | 5/2007 | Ho |
| 2007/0205118 A1 | 9/2007 | Westendorf et al. |
| 2007/0297736 A1 | 12/2007 | Sherman et al. |
| 2008/0156423 A1 | 7/2008 | Reuter |
| 2008/0233324 A1 | 9/2008 | Lee et al. |
| 2008/0233326 A1 | 9/2008 | Hegemier et al. |
| 2009/0004478 A1 | 1/2009 | Baetzold et al. |
| 2009/0016209 A1 | 1/2009 | Ikeda et al. |
| 2009/0087655 A1 | 4/2009 | Yamada et al. |
| 2009/0110861 A1 | 4/2009 | Sherman |
| 2009/0186181 A1 | 7/2009 | Mase |
| 2009/0257189 A1 | 10/2009 | Wang et al. |
| 2009/0260844 A1 | 10/2009 | Tseng |
| 2009/0301907 A1 | 12/2009 | Mason |
| 2010/0068446 A1 | 3/2010 | McGuire |
| 2011/0039099 A1 | 2/2011 | Sherman et al. |
| 2012/0057287 A1 | 3/2012 | Chaves et al. |
| 2012/0076967 A1 | 3/2012 | Muramatsu |
| 2012/0211171 A1 | 8/2012 | Patel et al. |
| 2012/0276318 A1 | 11/2012 | Franke |
| 2013/0033808 A1 | 2/2013 | Cohen et al. |
| 2013/0171400 A1 | 7/2013 | Lin |
| 2013/0299075 A1 | 11/2013 | Colby et al. |
| 2014/0041799 A1 | 2/2014 | Nam |
| 2014/0047708 A1 | 2/2014 | Chae |
| 2015/0047773 A1 | 2/2015 | Wadsworth et al. |
| 2015/0056395 A1 | 2/2015 | Lin |

(56) References Cited

U.S. PATENT DOCUMENTS

| | | |
|---|---|---|
| 2015/0107767 A1 | 4/2015 | Wadsworth et al. |
| 2015/0246514 A1 | 9/2015 | LaColla et al. |
| 2015/0257285 A1 | 9/2015 | Wilson et al. |
| 2015/0277502 A1 | 10/2015 | Witham et al. |
| 2015/0291854 A1 | 10/2015 | Colby et al. |
| 2015/0299461 A1 | 10/2015 | Suzuki et al. |
| 2016/0043765 A1 | 2/2016 | Ozeki |
| 2017/0253014 A1 | 9/2017 | Kleeman et al. |
| 2017/0297268 A1 | 10/2017 | Witham et al. |
| 2018/0081473 A1 | 3/2018 | Seo et al. |
| 2018/0314298 A1 | 11/2018 | Scaggs |
| 2019/0229763 A1 | 7/2019 | Nebel et al. |
| 2020/0094467 A1 | 3/2020 | Cho et al. |
| 2020/0198223 A1 | 6/2020 | Sorensen et al. |
| 2020/0204664 A1 | 6/2020 | Bulkley et al. |
| 2020/0234029 A1 | 7/2020 | Fukunaga et al. |
| 2021/0317948 A1 | 10/2021 | Gioco |

FOREIGN PATENT DOCUMENTS

| | | |
|---|---|---|
| EP | 1018680 A2 | 7/2000 |
| EP | 1939263 A1 | 7/2008 |
| WO | 2009105297 A2 | 8/2009 |
| WO | 2011112817 A1 | 9/2011 |
| WO | 2019140932 A1 | 7/2019 |

OTHER PUBLICATIONS

"How to put a Screen protector on Apple iPhone or just any phone" (Along with screenshots and transcript thereof) Published on Aug. 26, 2008http://www.youtube.com/watch?v=ATvjrxCXt40.

"InvisibleSHIELD Dry Install Walkthrough—iPhone 4" (Along with screenshots and transcript thereof)Published on Jul. 15, 2010http://www.youtube.com/watch?v=vXPAuYmkJIU.

"ZAGG (ZAGG) Introduces Two New Products at CTIA Wireless Show"; Published on Mar. 24, 2010www.streetinsider.com (Article printed on Sep. 10, 2012).

"ZAGG to Introduce invisibleSHIELD Dry (TM) Nationwide Exclusively Through AT&T"; Published on Jun. 28, 2010www.businesswire.com (Article printed on Sep. 10, 2012).

IPodlounge Buyers' Guide 2004, Issue 1, Published Nov. 2004.

NLU Video Tape No. 1 (along with screenshots and transcript thereof) of the Application of NLU BodyGuardz film to ipod published on YouTube on Nov. 20, 2006.

NLU Video Tape No. 2 (along with screenshots and transcript thereof) of the Application of NLU BodyGuardz film to ipod nano published on YouTube on < Sep. 1, 2010.

\* cited by examiner

APPARATUS FOR INSTALLING A SCREEN PROTECTOR ON AN ELECTRONIC DEVICE

CROSS REFERENCE TO RELATED APPLICATIONS

The present application is a continuation of U.S. patent application Ser. No. 17/506,835, filed Oct. 21, 2021, now U.S. Pat. No. 11,685,106, which is a continuation of U.S. patent application Ser. No. 16/985,933, filed Aug. 5, 2020, now U.S. Pat. No. 11,186,031, which claims priority to U.S. Provisional Patent Application No. 62/885,381, filed Aug. 12, 2019, all of which are hereby incorporated by reference in their entireties.

BACKGROUND

The present invention relates generally to an apparatus for installing a screen protector over a display screen of an electronic device.

Screen protectors are used to cover and protect the display screens of electronic devices. Screen protectors may be used to protect, for example, the surface of digital electronic device display components during manufacture, or may be adhered to a display screen of a completed device to protect it from damage during normal day-to-day use. At least a portion of the screen protector is often transparent, and may permit the use of touch-sensitive features of the electronic device through the screen protector. Screen protectors may be formed of a glass material, such as soda lime glass or fortified glass, or a polymeric material, such as a plastic film or a composite of one or more polymers.

Display screens for electronic devices may have a substantially flat surface, a substantially curved surface, or a substantially flat main portion and one or more curved or rounded edge portions. Compound curves may also be possible.

In some situations, it can be difficult to properly align the screen protector when applying or adhering it to the display screen of the electronic device. Poor alignment may result in poor adhesion between the screen protector and the electronic device. Additionally, misaligned edges of the screen protector may result in an inability to use a protective case with the installed screen protector, or the screen protector inadvertently becoming detached from the electronic device when a protective case is installed on the electronic device.

Improvements in one or more of the foregoing are desired.

SUMMARY

In one exemplary embodiment, an apparatus is provided for assisting in affixing a screen protector to a display of an electronic device. The apparatus includes a base having a platform for supporting the electronic device, a lid attached to the base, and a positioning mechanism for positioning the electronic device on the platform. The positioning mechanism includes a first positioning jaw movable between a first and a second position. The positioning jaw includes a first surface configured to contact the first corner of the supported electronic device and a second surface configured to contact the second corner of the supported electronic device when the first positioning jaw moves from the first position to the second position. The first positioning jaw is configured to position the supported electronic device on the platform in the second position. Moving the lid from a first position to a second position at least partially covering the electronic device moves the first positioning jaw from the first position to the second position.

In one exemplary embodiment, a screen protector cartridge assembly is provided. The assembly includes a screen protector including an adhesive positioned on a bottom side. The screen protector is configured to protect a display of an electronic device. The assembly includes a cartridge board releasably attached to the screen protector. The cartridge board includes an aperture providing access to the screen protector. The assembly includes a bottom release liner covering the adhesive and releasably attached to the bottom surface of the screen protector.

In one exemplary embodiment, an apparatus is provided for assisting in affixing a screen protector to a display of an electronic device. The apparatus includes a base including a platform configured to support the electronic device. The apparatus includes a lid configured to cover at least a portion of the base and the supported electronic device, the lid including an aperture. The apparatus includes a gantry including a roller configured to contact a screen protector through the aperture in the lid. The gantry is movable with respect to the lid and configured to affix the screen protector to the supported electronic device when the gantry moves from a first position to the second position.

Various other embodiments and variations of the apparatuses, methods, and systems are also disclosed. While multiple embodiments are disclosed, still other embodiments will become apparent to those skilled in the art from the following detailed description and figures, which describe and show illustrative embodiments of the invention. As will be realized, the invention is capable of modifications in various aspects, all without departing from the scope of the present invention. Accordingly, the drawings and detailed description are to be regarded as illustrative in nature and not restrictive.

DETAILED DESCRIPTION

Figure 1:
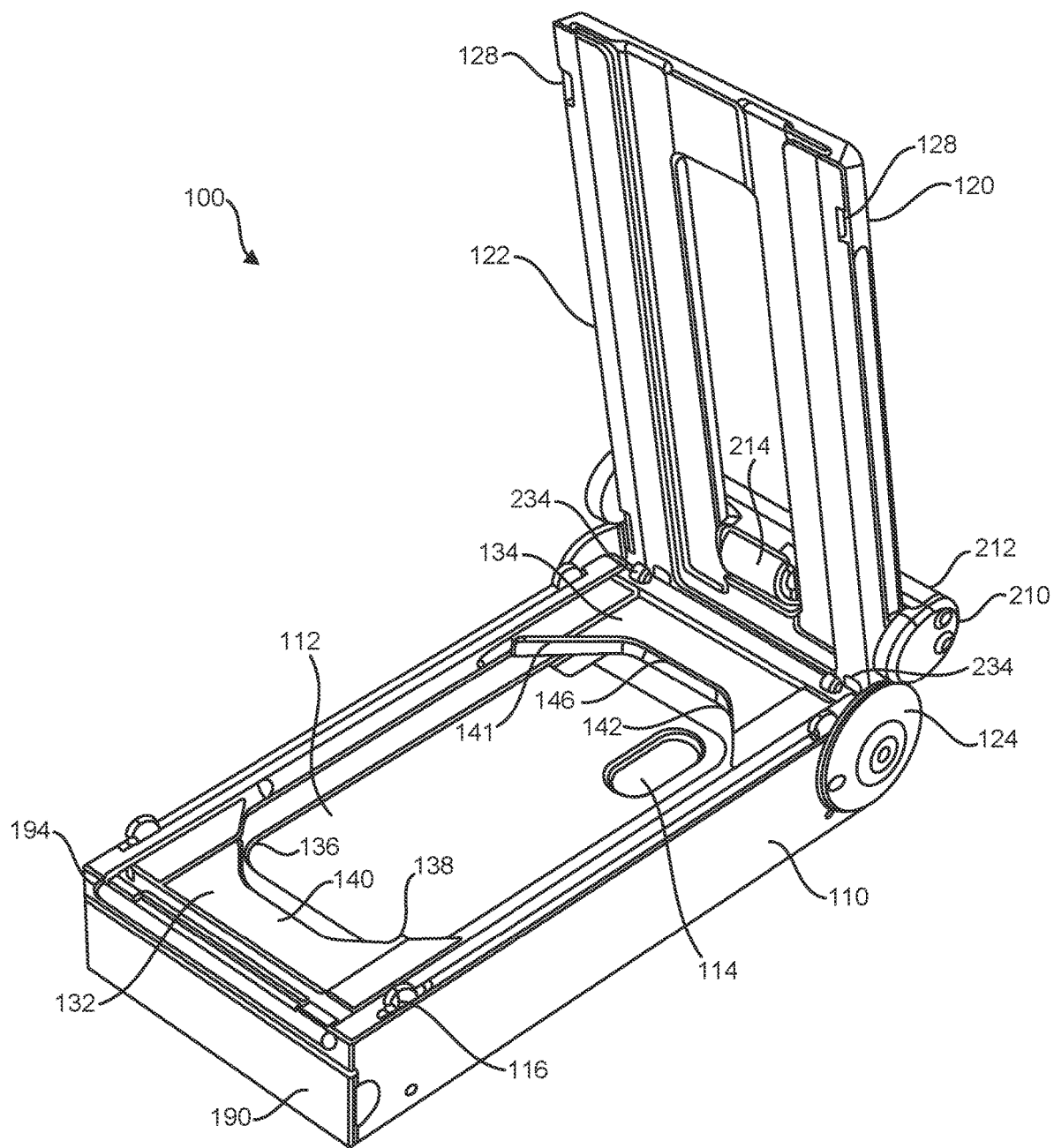
FIG. 1 illustrates a perspective view of an exemplary apparatus for installing a screen protector on an electronic device.
Figure 2:
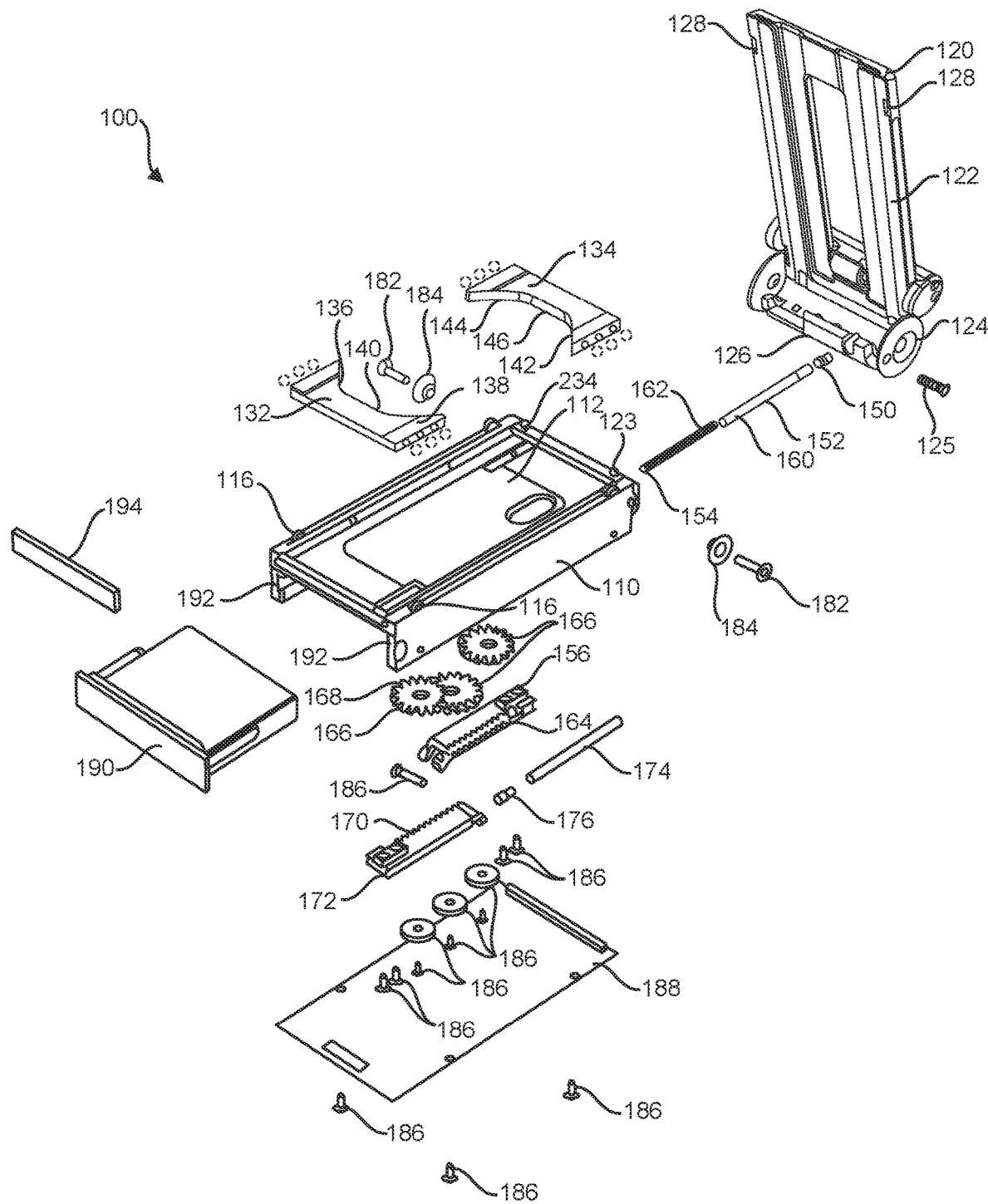
FIG. 2 illustrates an exploded view of the apparatus of FIG. 1.

FIGS. 1-8 illustrate an exemplary embodiment of an apparatus 100 for installing a screen protector 52 (see FIG. 9) on a display 92 of an electronic device 90 (see FIG. 3), such as a smartphone or tablet computer. As illustrated in FIG. 1, apparatus 100 is in an initial configuration prior to screen protector cartridge assembly 50 or electronic device 90 being received by apparatus 100. An exploded perspective view of apparatus 100 is illustrated in FIG. 2.

Apparatus 100 includes a base 110 having a platform 112 for supporting the electronic device 90. In some embodiments, platform 112 has at least one dimension, such as a length or a width, that is larger than a corresponding dimension of the supported electronic device 90. In some embodiments, platform 112 includes a recess 114 aligned to receive a feature extending from a back surface of electronic device 90, such as a camera, a flash, and/or a fingerprint sensor. Recess 114 allows electronic device 90 to sit flat against platform 112 when electronic device 90 is properly positioned. Recess 114 may have at least one dimension that is larger than a corresponding dimension of the feature of electronic device 90.

Figure 5:
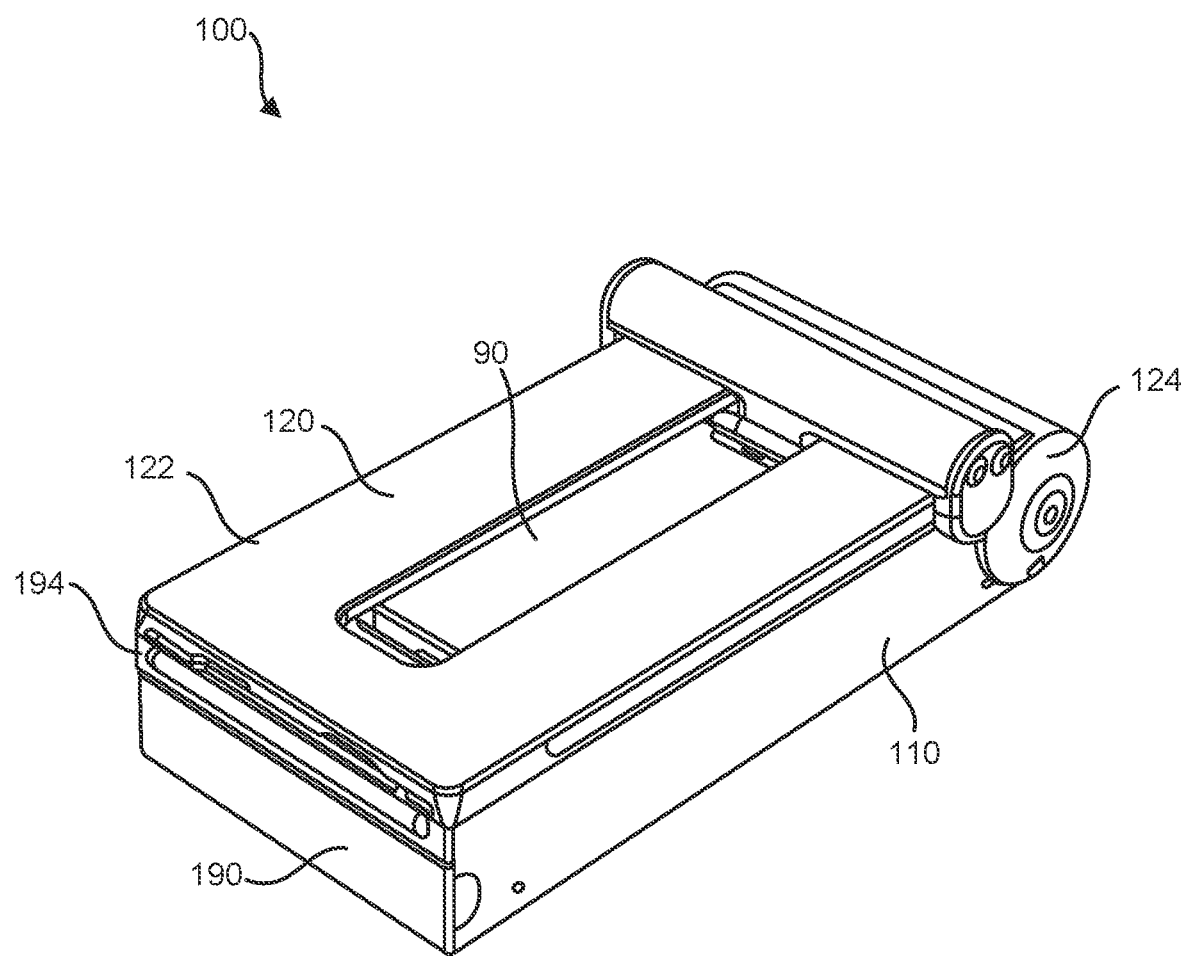
FIG. 5 illustrates the apparatus of FIG. 1 with the lid in the closed position.

Apparatus 100 further includes a lid 120 attached to base 110. Lid 120 is attached to base 110 and is moveable with respect to base 110 between a first position for receiving the electronic device 90 such as illustrated in FIGS. 1 and 3, and a second position at least partially covering the base 110 and supported electronic device 90, such as illustrated in FIG. 5.

In some embodiments, lid 120 includes a first portion 122. First portion 122 at least partially covers the base 110 and supported electronic device 90 when the lid is in the second position as illustrated in FIG. 5.

In some embodiments, lid 120 includes a second portion 124. Second portion 124 is attached to base 110 and allows lid 120 to move between the first position and the second position. In the illustrated embodiment, base 110 is pivotably or rotatably attached to lid 120 through second portion 124. In other embodiments, base 110 may be slidably attached to lid 120 through second portion 124. In still other embodiments, lid 120 may be completely removable from base 110.

Figure 3:
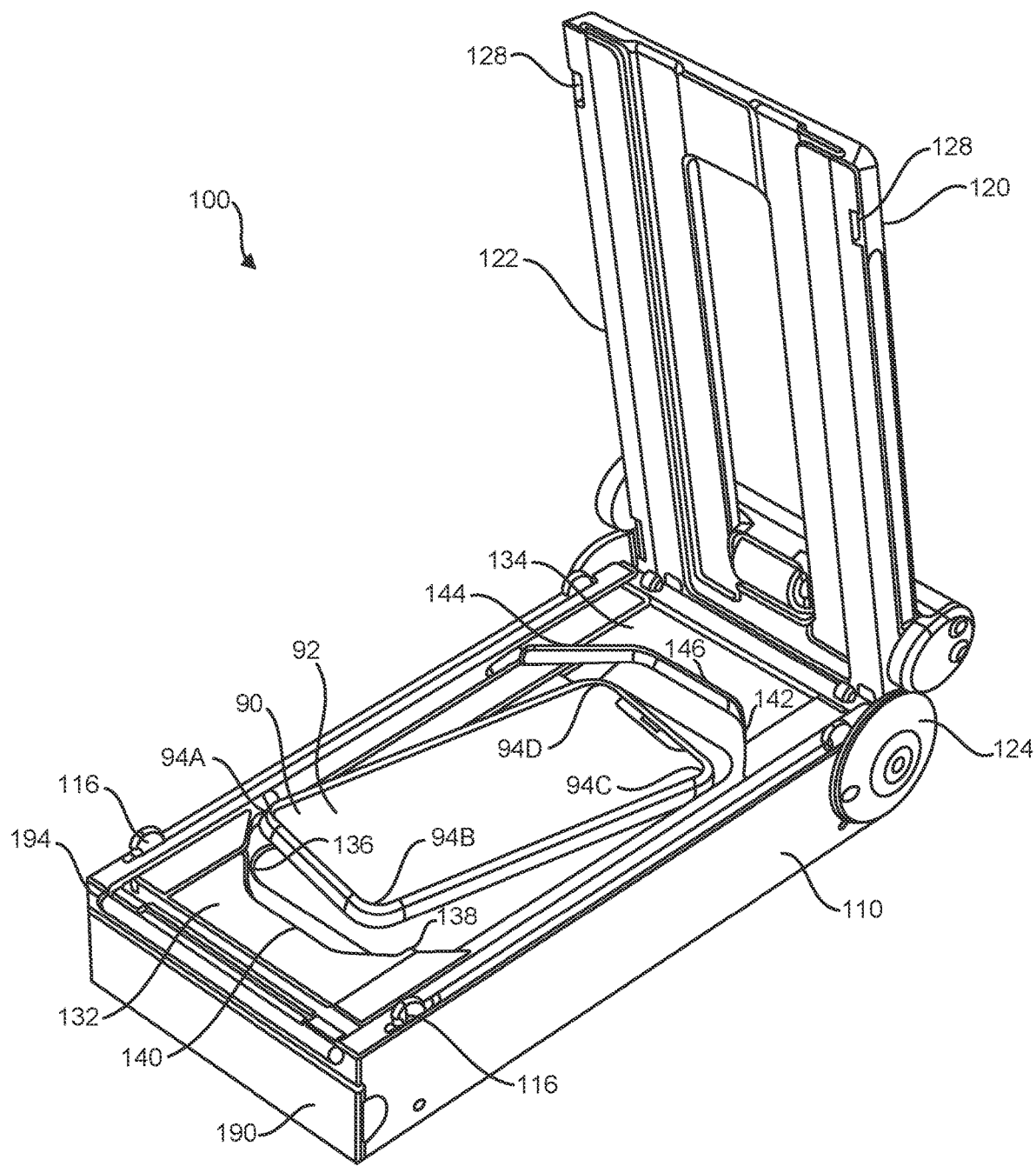
FIG. 3 illustrates an electronic device loaded into the apparatus of FIG. 1 with the lid in the open position.

In some embodiments, second portion 124 include a biasing element 125 such as a spring or flexing element that biases or temporarily holds lid 120 in the first position as illustrated in FIGS. 1 and 3.

Figure 4:
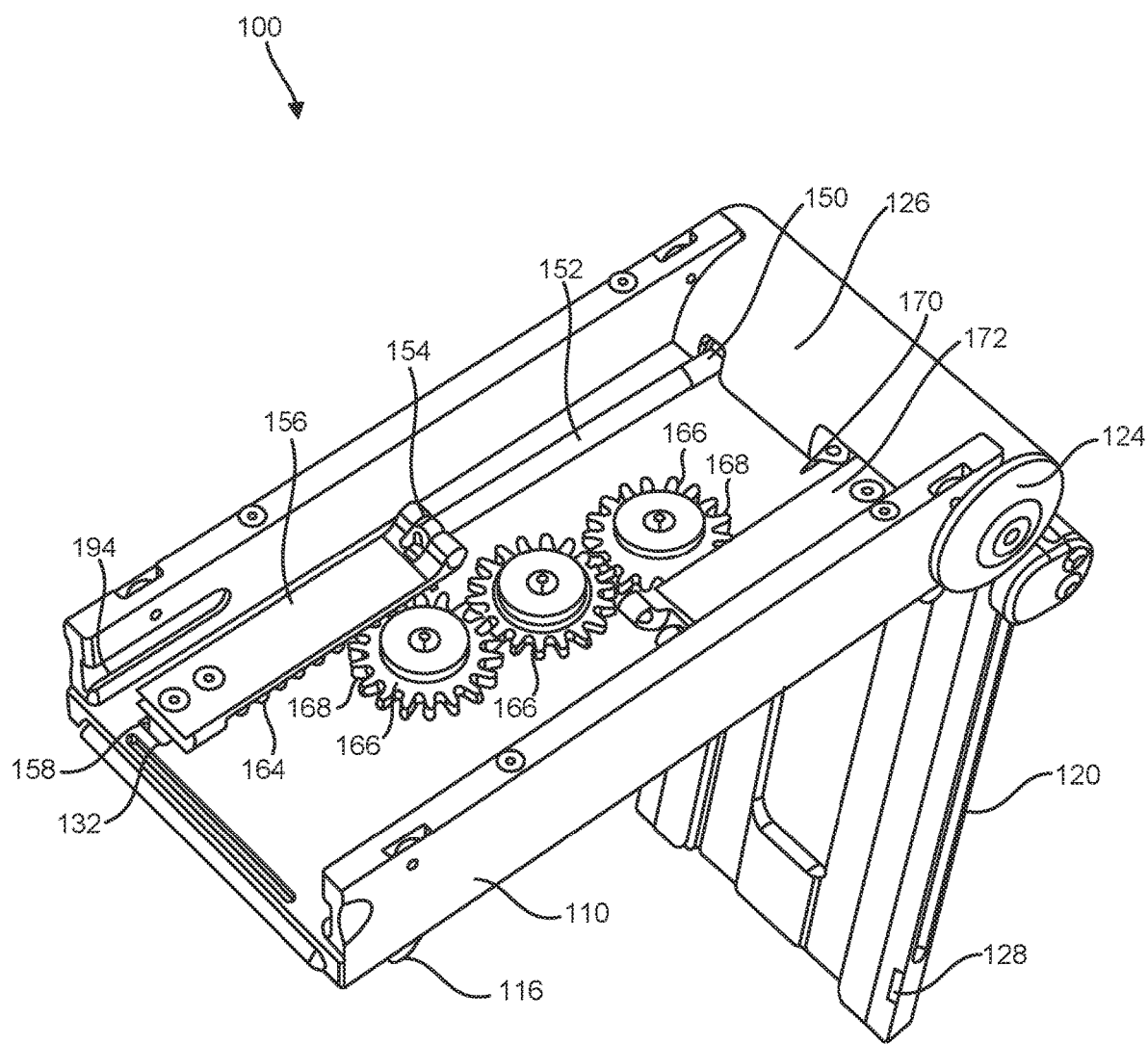
FIG. 4 illustrates a bottom view of the apparatus of FIG. 1 with the bottom cover removed and the lid in the open position.
Figure 6:
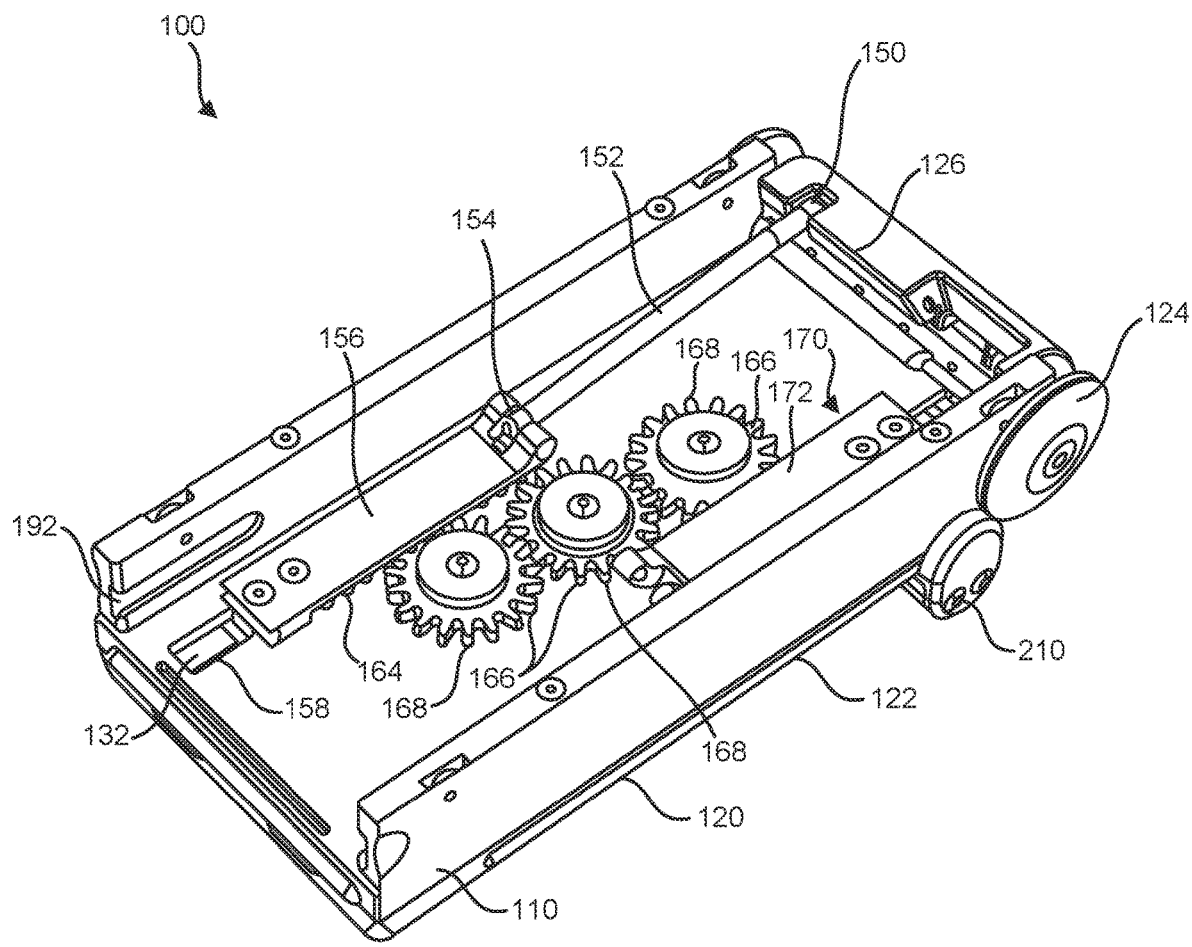
FIG. 6 illustrates a bottom view of the apparatus of FIG. 1 with the bottom cover removed and the lid in the closed position.

In some embodiments, second portion 124 includes a lower edge 126 extending around a bottom side of body 110 (see FIGS. 4 and 6). As illustrated in FIGS. 4 and 6, lower edge 126 moves between a first position illustrated in FIG. 4 and a second position illustrated in FIG. 6 in response to the lid 120 moves between the corresponding first and second positions.

In some embodiments, body 110 includes a latch 116 configured to releasably secure lid 120 in the second position illustrated in FIG. 5 through slot 128 in first portion 122 of lid 120. In other embodiments, latch 116 is positioned to be received within a corresponding slot 128 positioned elsewhere on lid 120. In still other embodiments, latch 116 is positioned on lid 120 to be received with in a corresponding slot 128 on body 110.

In some exemplary embodiments, such as illustrated in FIG. 1, apparatus 100 further includes a positioning mechanism 130 for aligning and/or positioning electronic device 90 on platform 112. In some embodiments, positioning mechanism 130 includes a first positioning jaw 132 and a second positioning jaw 134. In other embodiments, positioning mechanism 130 may include a first positioning jaw 132 but not a second positioning jaw 134.

Figure 7:
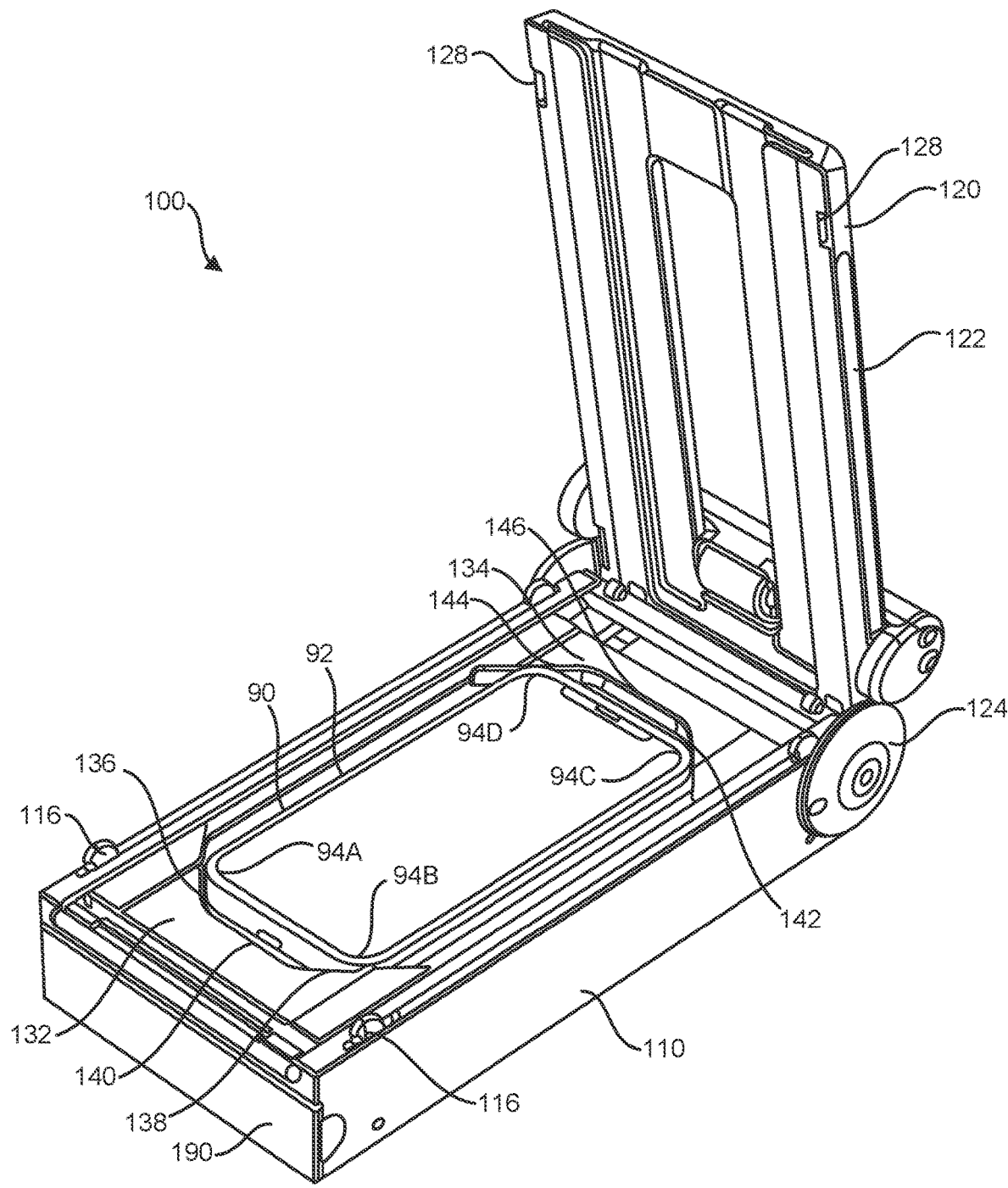
FIG. 7 illustrates the apparatus of FIG. 1 with the lid in the open position and the positioning mechanism engaging the electronic device.

First positioning jaw 132 is moveable between a first position for receiving electronic device 90, such as illustrated in FIG. 3, and a second position contacting one or more corners 94 of electronic device 90, such as first corner 94A and second corner 94B, as illustrated in FIG. 7. In some embodiments, moving first positioning jaw 132 from the first position to the second position results in the electronic device 90 being preferably positioned platform 112.

First positioning jaw 132 includes a first surface 136 configured to contact a first corner 94A of electronic device 90 and a second surface 138 configured to contact a second corner 94B of electronic device 90 as the first positioning jaw 132 moves from the first position to the second position. First positioning jaw 132 further includes an intermediate surface 140 positioned between first surface 136 and second surface 138 that is configured to not contact electronic device. In some embodiments, first surface 136 is positioned at an angle with respect to second surface 138 to assist in aligning and/or positioning electronic device 90. In a more particular embodiment, first surface 136 is positioned at an angle as little as 30°, 45°, 60°, 75°, 90°, 105°, 120°, 135°, 150° with respect to second surface 138, or within any range defined between any two of the foregoing values, such as 30° to 150°, 60° to 120°, or 75° to 105°. In some embodiments, first surface 136 and/or second surface 138 has a curved shape to allow first corner 94A and/or second corner 94B to slide along the respective surface to assist in aligning and/or positioning electronic device 90 as first positioning jaw 132 is moved from the first position to the second position.

Referring to FIGS. 4 and 6, first positioning jaw 132 is operably connected to lower edge 126 of lid 120 such that moving the lid 120 from the first position illustrated in FIG. 4 to the second position illustrated in FIG. 6 results in the first positioning jaw 132 moving from the first position illustrated in FIG. 3 to the second position illustrated in FIG. 7, thereby aligning and/or positioning electronic device 90 on platform 112. Lower edge 126 is rotatably or pivotably connected to a first end 150 of drive shaft 152. A second end 154 of drive shaft 152 is connected to a slidable rack member 156 attached to first positioning jaw 132 through aperture 158 in platform 112.

Movement of the lid 120 as it moves from the first position to the second position is transferred as lateral movement from the lower edge 126 of lid 120 through the drive shaft 152 and slidable rack member 156, resulting in a lateral movement of the attached first positioning jaw 132 between the first position and the second position.

In some embodiments, drive shaft 152 comprises a tube 160 and a spring 162 positioning at least partially inside tube 160. A portion of the lateral movement transferred from the lower edge 126 of the lid 120 may be absorbed by the spring 162 rather than transmitted to slidable rack member 156. In this way, electronic devices 90 of varying sizes may be positioned by apparatus 100, with larger electronic devices 90 resulting in a larger portion of the lateral movement being absorbed by the spring than smaller electronic devices 90.

In some embodiments, second positioning jaw 134 is moveable between a first position for receiving the electronic device, such as illustrated in FIG. 3, and a second position contacting one or more corners 94 of electronic device, such as third corner 94C and fourth corner 94D, as illustrated in FIG. 7. In some embodiments, moving second positioning jaw 134 from the first position to the second position results in the electronic device 90 being positioned platform 112. In other embodiments, second positioning jaw 134 does not move, and instead is stationary while only first positioning jaw 132 moves between a first position and a second position.

In some embodiments, second positioning jaw 134 includes a first surface 142 configured to contact a third corner 94C of electronic device 90 and a second surface 144 configured to contact a fourth corner 94D of electronic device 90 as the second positioning jaw 134 moves from the first position to the second position. In other embodiments, second positioning jaw 134 includes a first surface 142 configured to contact a third corner 94C of electronic device 90 and a second surface 144 configured to contact a fourth corner 94D of electronic device 90 while first positioning jaw 132 moves from the first position to the second position, pushing electronic device 90 against second positioning jaw 134. Second positioning jaw 134 further includes an intermediate surface 146 positioned between first surface 142 and second surface 144 that is configured to not contact electronic device. In some embodiments, first surface 142 is positioned at an angle with respect to second surface 144 to assist in aligning and/or positioning electronic device 90. In a more particular embodiment, first surface 142 is positioned at an angle as little as 30°, 45°, 60°, 75°, 90°, 105°, 120°, 135°, 150° with respect to second surface 144, or within any range defined between any two of the foregoing values, such as 30° to 150°, 60° to 120°, or 75° to 105°. In some embodiments, first surface 142 and/or second surface 142 has a curved shape to allow third corner 94C and/or fourth corner 94D to slide along the respective surface to assist in aligning and/or positioning electronic device 90.

Referring again to FIGS. 4 and 6, in some embodiments second positioning jaw 134 is operably connected to lower edge 126 of lid 120 such that moving the lid 120 from the first position illustrated in FIG. 4 to the second position illustrated in FIG. 6 results in the second positioning jaw 134 moving from the first position illustrated in FIG. 3 to the second position illustrated in FIG. 7, thereby aligning and/or positioning electronic device 90 on platform 112.

Figure 16:
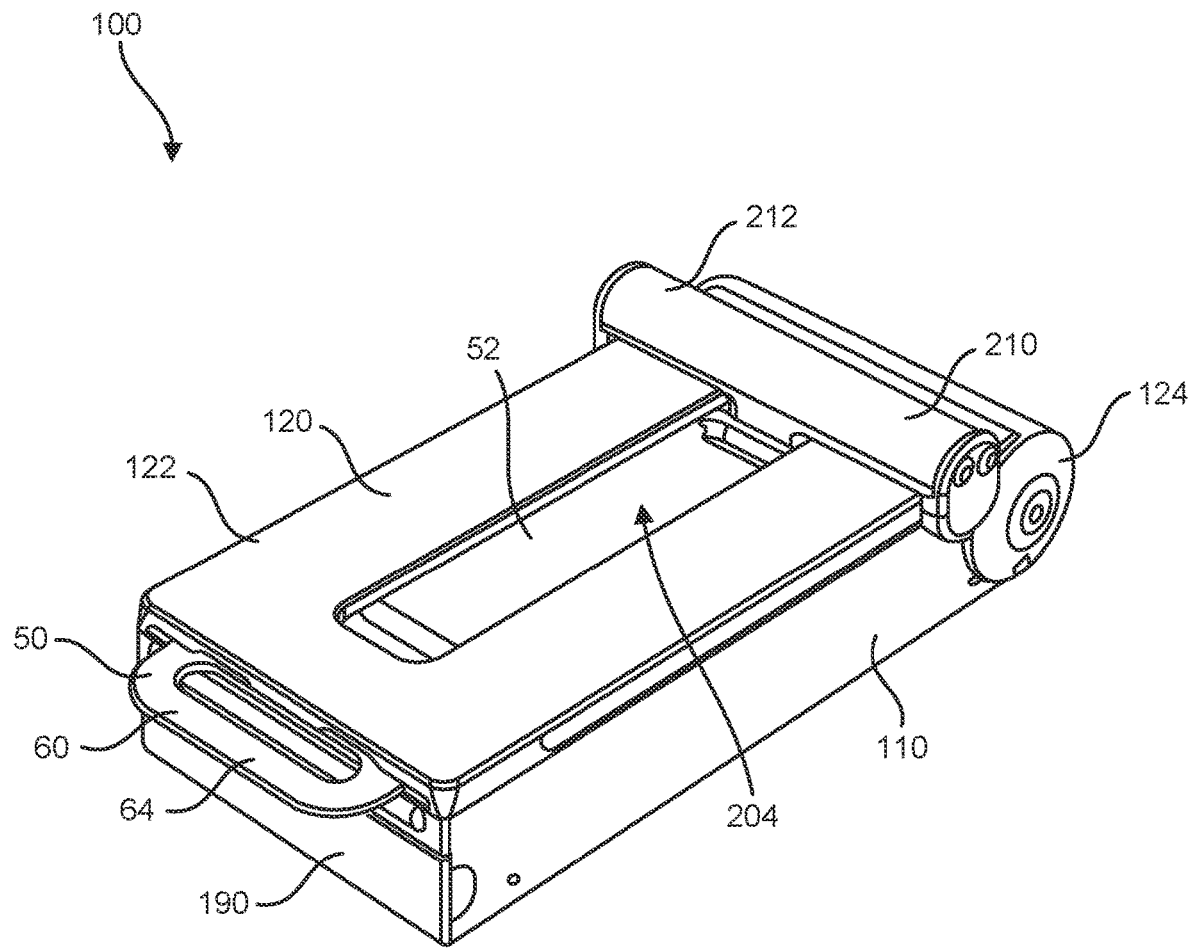
FIG. 16 illustrates the apparatus of FIG. 14 with the lid closed and the gantry in the back position.

In some embodiments, aligning and/or positioning electronic device 90 includes moving electronic device 90 from an initial position, such as illustrated in FIG. 3, to a position in which screen protector 52 is to be affixed to display 92 of electronic device 90. In some embodiments, it can be important for display 92 to be properly positioned with respect to screen protector 52 such that screen protector 52 is aligned with display 92 for proper application and fit of screen protector 52 onto display 92. In some embodiments, aligning and/or positioning electronic device 90 includes centering electronic device 90 onto platform 112 of base 110. In other embodiments, electronic device 90 is not centered on platform 112 when aligned and/or positioned, but is in a location directly below a corresponding position of screen protector 52 when screen protector cartridge assembly 50 is received within lid 120 and lid 120 is moved to the second position, such as illustrated in FIG. 16.

As illustrated in FIG. 4, in some embodiments slidable rack member 156 includes a first plurality of teeth 164 configured to engage one or more gears 166 positioned below platform 112. The one or more gears 166 each illustratively include a plurality of teeth 168, some of which engage first plurality of teeth 164 of slidable rack member 156, some of which engage teeth 168 of an adjacent gear 166, and some of which engage teeth 170 of a second slidable rack member 172. Second slidable rack member 172 is illustratively connected to second positioning jaw 134 through an aperture (not shown) in platform 112. Lateral movement of slidable rack member 156 is translated through rotation of the gears 168 to lateral movement of second slidable rack member 172 and attached second positioning jaw 134.

In some embodiments, a second drive shaft 174 may be attached at a first end 176 to second slidable rack member 172. In some embodiments, second drive shaft 174 may include a spring (not shown) configured to absorb a portion of the lateral movement being transferred from second slidable rack member 172 to second positioning jaw 134.

Referring again to FIG. 2, in some embodiments, apparatus 100 includes one or more pivotable connectors 182 for connecting base 110 to lid 120. In some embodiments, connectors 182 may include a friction cone 184 for slowing an opening speed of lid 110 due to biasing element 125. FIG. 2 further illustrates a variety of connectors 186 for affixing various components together, including for securing gears 166 to base 110 and bottom cover 188 to base 110.

Apparatus 100 further includes a removable tray 190 received within grooves 192 in base 110. Tray 190 is configured to collect and store a removable liner 70 (see FIGS. 9-12) from screen protector cartridge 50. Tray 190 illustratively includes a removable rear cover 194 for emptying one or more removable liners 70 from tray 190.

Referring next to FIG. 3, an electronic device 90 is positioned on platform 112 with the display 92 facing upward. As illustrated in FIG. 3, there is no need for electronic device 90 to be manually positioned onto platform 112 by the user, as long as the corners 94A-94D of electronic device are positioned between first positioning jaw 132 and second positioning jaw 134. As illustrated in FIGS. 3 and 4, in this position, the lid 120, first positioning jaw 132 and second positioning jaw 134, as well as corresponding slidable rack members 156, 172, are each positioned in their respective first positions.

Referring next to FIGS. 5 and 6, the lid 120 has been closed, moving it from the first position to the second position. The movement of lower edge 126 of lid 120 has moved slidable rack member 156 and attached first positioning jaw 132 to the second position. In some embodiments, a portion of the lateral movement due to movement of lid 120 has been absorbed by spring 162 of driveshaft 152 rather than transferred to first positioning jaw 132. The movement slidable rack member 132 has been transferred through gears 168 to second slidable rack member 172 and attached second positioning jaw 134. The movement of first positioning jaw 132 and second positioning jaw 134 has resulted in the surfaces 136, 138, 142, 144 of the positioning jaws 132, 134 each contacting a respective corner 94A, 94B, 94C, 94D of electronic device 90, aligning, positioning, and/or centering electronic device 90 on platform 112.

Figure 8:
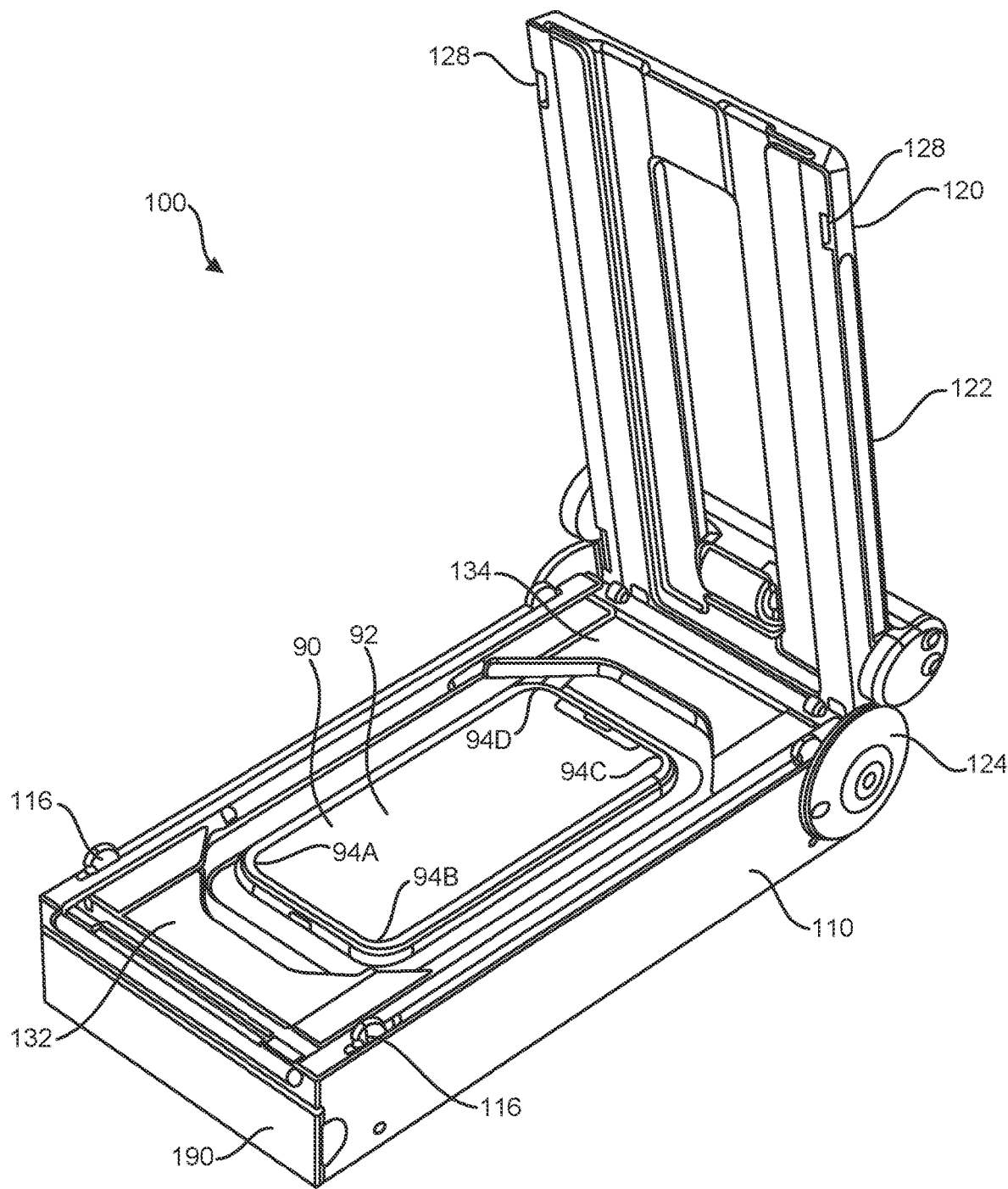
FIG. 8 illustrates the apparatus of FIG. 1 with the lid in the open position and the electronic device positioned in the apparatus.
Figure 9:
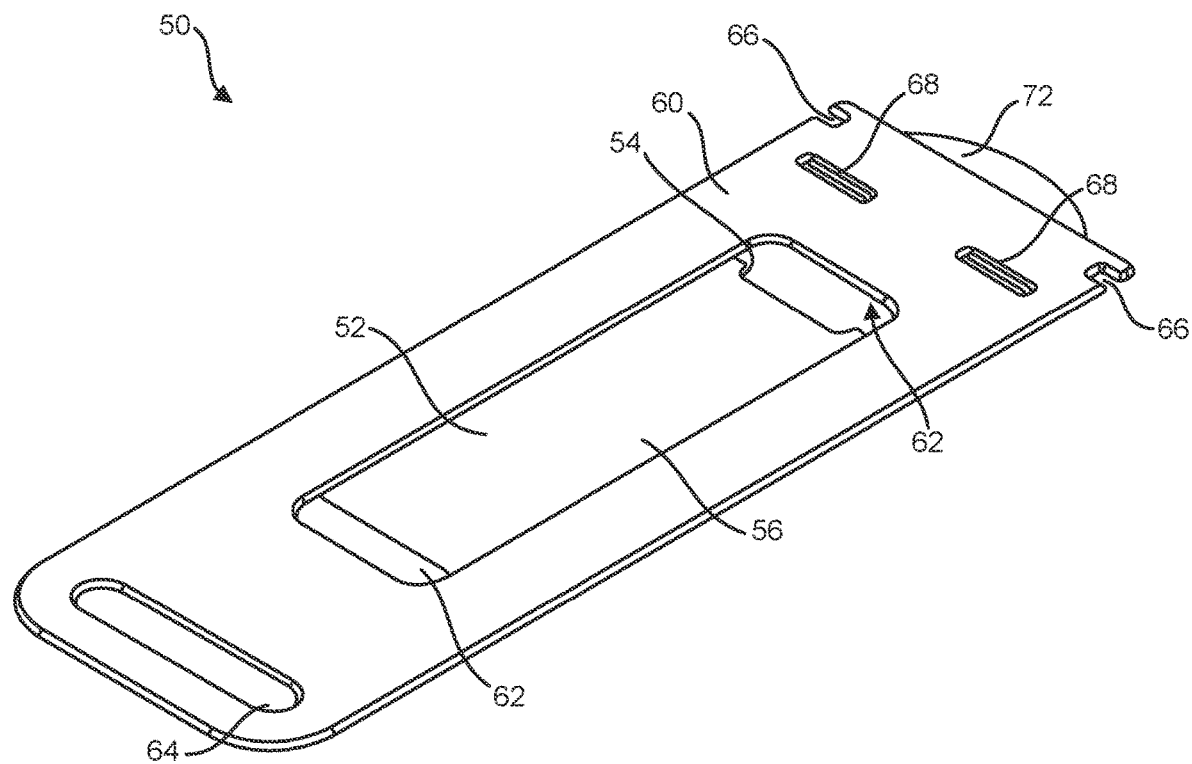
FIG. 9 illustrates an exemplary screen protector cartridge assembly including a screen protector.
Figure 10:
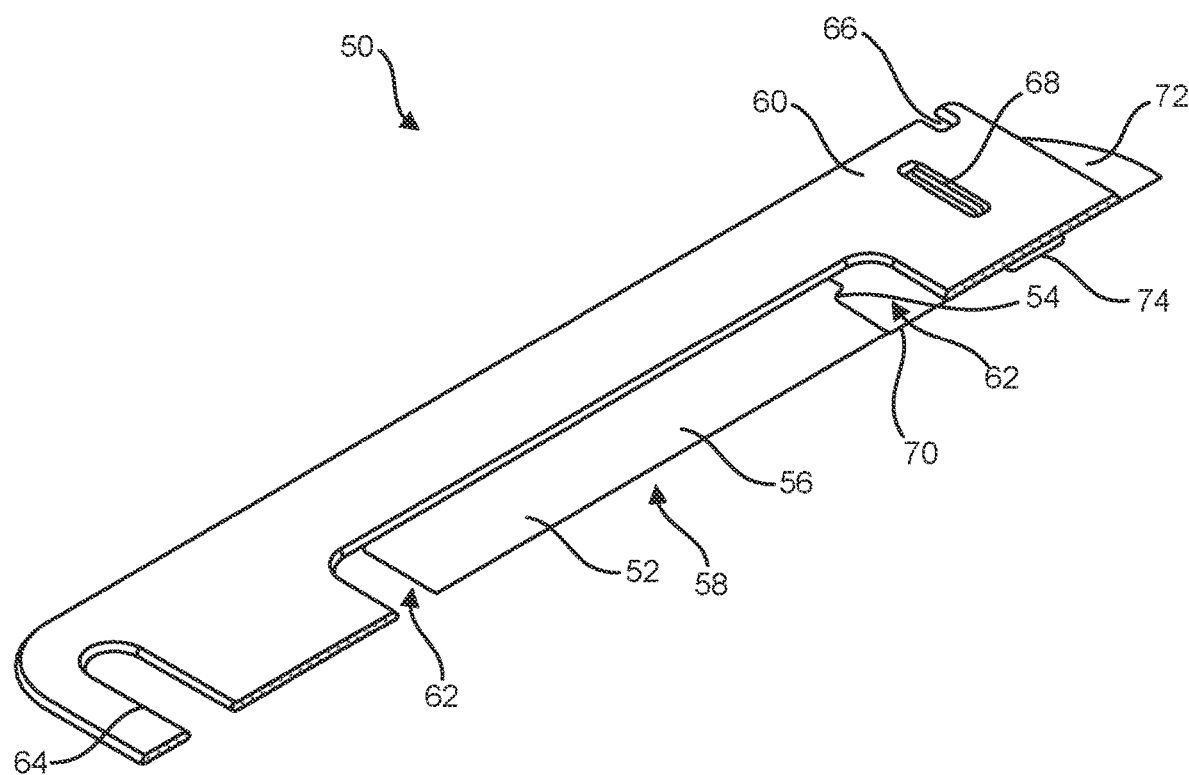
FIG. 10 illustrates a perspective sectional view of the screen protector cartridge assembly of FIG. 9.
Figure 11:
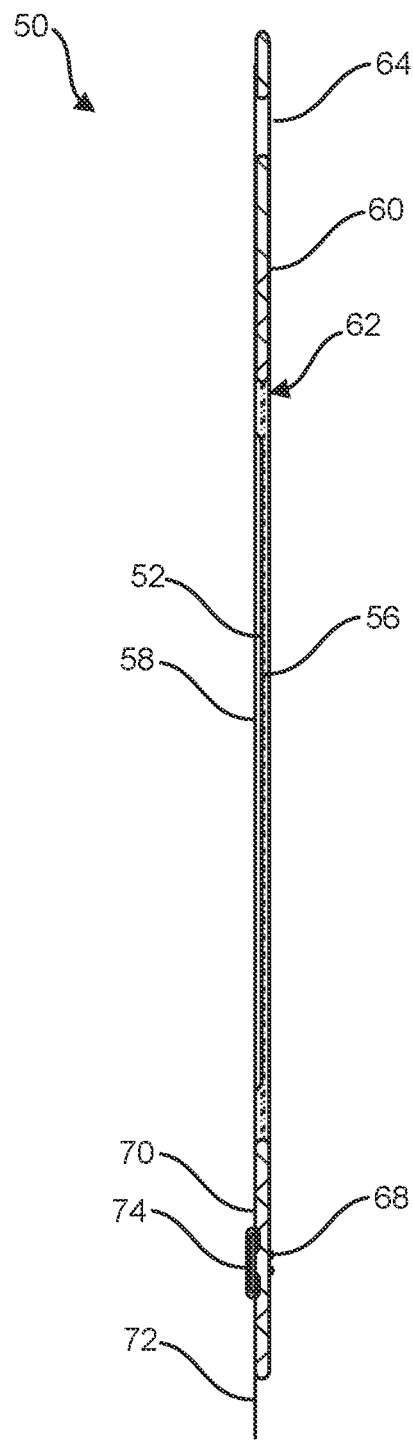
FIG. 11 illustrates a side sectional view of the screen protector cartridge assembly of FIG. 9.
Figure 12:
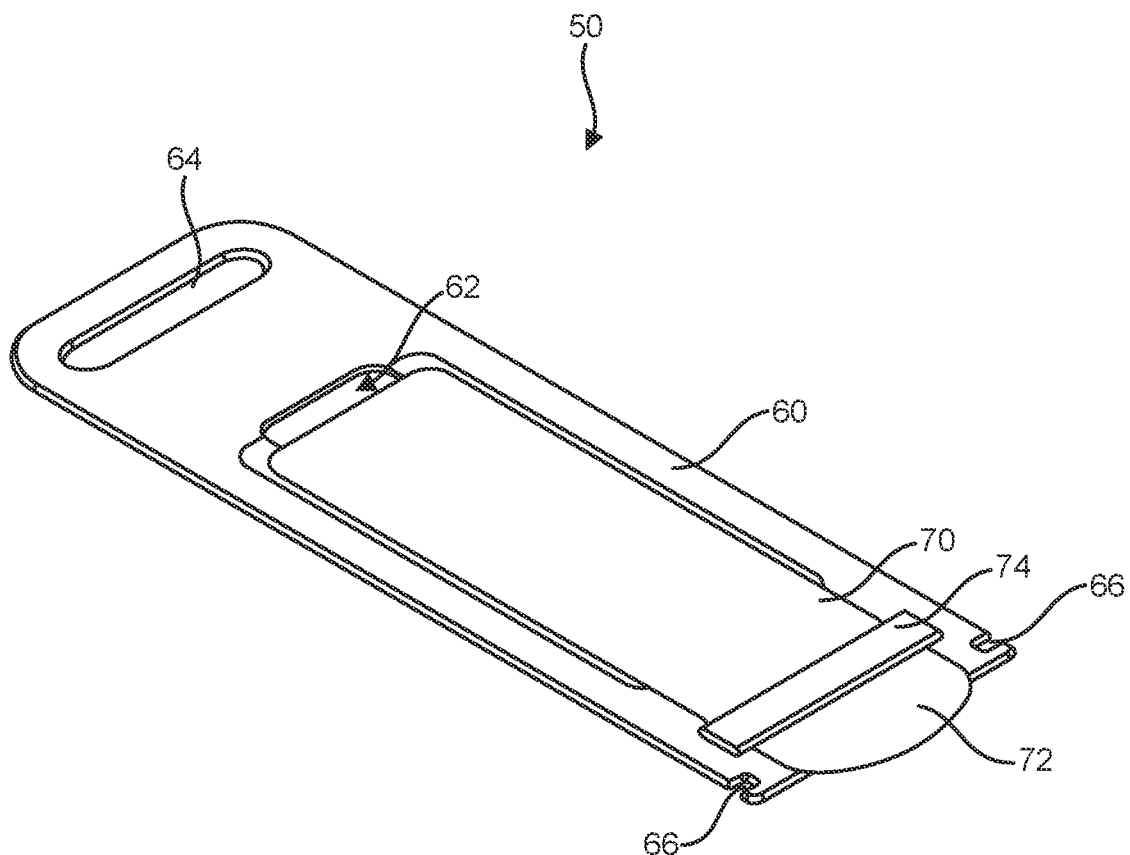
FIG. 12 illustrates a bottom view of the screen protector cartridge assembly of FIG. 9.

Referring next to FIGS. 7 and 8, the electronic device 90 is illustrated aligned and positioned on platform 112 with the lid 110 returned to the open position. In some embodiments, the first positioning jaw 132 and second positioning jaw 134 will remain in their respective second positions when the lid 110 is returned to the first open position as illustrated in FIG. 7. In other embodiments, the first positioning jaw 132 and second positioning jaw 134 are biased to return to their respective first position when the lid 110 is returned to the first open position as illustrated in FIG. 8.

Referring next to FIGS. 9-12, an exemplary screen protector cartridge assembly 50 is illustrated for use with apparatus 100. Screen protector cartridge assembly 50 includes a screen protector 52. Screen protector 52 comprises a transparent material for protecting a display 92 of the electronic device 90 (see FIG. 3). Exemplary transparent materials include glass, such as soda lime glass or fortified glass, or a polymeric material, such as a plastic film or composite of one or more polymers. Screen protector 52 typically has a shape corresponding to a shape of the display 92 of electronic device 90, and in some embodiments the shape of electronic device 90 comprises a flat surface, a substantially curved surface, or a substantially flat main portion and one or more curved or rounded edge portions. In the exemplary embodiment illustrated in FIGS. 9-10, screen protector 52 includes one or more notches 54 or cutouts configured to align with a feature of electronic device 90. In some embodiments, a removable top liner 56 covers at least a portion of the top side of screen protector 52. Opposite removable top liner 56, a suitable adhesive 58 is positioned on a back side of the screen protector 52 for affixing the screen protector 52 to the display 92 of the electronic device. Adhesive 58 is illustratively covered by a removable liner 70.

In the exemplary embodiment illustrated in FIGS. 9-12, screen protector cartridge assembly 50 includes cartridge board 60. In some embodiments, cartridge board 60 is formed from a relatively stiff or rigid material. In other embodiments, cartridge board 60 is formed from a flexible material.

In some embodiments, cartridge board 60 has a substantially rectangular shape, such as illustrated in FIGS. 9-12. In other embodiments, cartridge board 60 has a substantially wedge shape to assist properly positioning and registering screen protector cartridge assembly 50 within apparatus 100.

A top side of screen protector 52 is releasably attached to cartridge board 60 with a suitable adhesive. In some embodiments, screen protector 52 is directly attached to cartridge board 60 with the adhesive. In other embodiments, removable top liner 56 is attached to cartridge board 60 with the adhesive.

Cartridge board 60 includes an aperture 62 through which screen protector 52 is accessible, either directly or through removable top liner 56. In some embodiments, aperture 62 is completely surrounded by cartridge board 60. In other embodiments, aperture 62 is only partially surrounded by cartridge board 60.

In some embodiments, cartridge board 60 includes a handle 64 for a user to manipulate screen protector cartridge assembly 50. In some embodiments, cartridge board 60 includes one or more slots 66 for engaging releasable tabs 234 in base 110 for properly positioning and registering screen protector cartridge assembly 50 within apparatus 100. In some embodiments, cartridge board 60 includes one or more recesses 68 for properly positioning and/or registering screen protector cartridge assembly 50 within apparatus 100.

In some embodiments, positioning and/or registering screen protector cartridge assembly 50 within apparatus 100 includes fully inserting screen protector cartridge assembly 50 along grooves 202 of lid 120 until slots 66 engage releasable tabs 234 and/or recesses 68 engage corresponding features in lid 120. In some embodiments, it can be important for screen protector cartridge assembly 50 be properly positioned with respect to electronic device 90 such that screen protector 52 is aligned with display 92 for proper application and fit of screen protector 52 onto display 92 when electronic device 90 is properly aligned and/or positioned on platform 112 of apparats 100.

Removable liner 70 covers adhesive 58 on the back side of screen protector 52. In some embodiments, removable liner 70 has a size that is larger than that of screen protector one or both of a length dimension and a width dimension.

In some embodiments, removable liner 70 includes a leading edge 72 extending outside a footprint of cartridge board 60.

In some embodiments, removable liner 70 and/or cartridge board 60 includes a wiper 74 for cleaning display 92 of electronic device 90 when screen protector cartridge assembly 50 is inserted into apparatus 100. Wiper 74 is illustratively a microfiber cloth or sponge.

Figure 13:
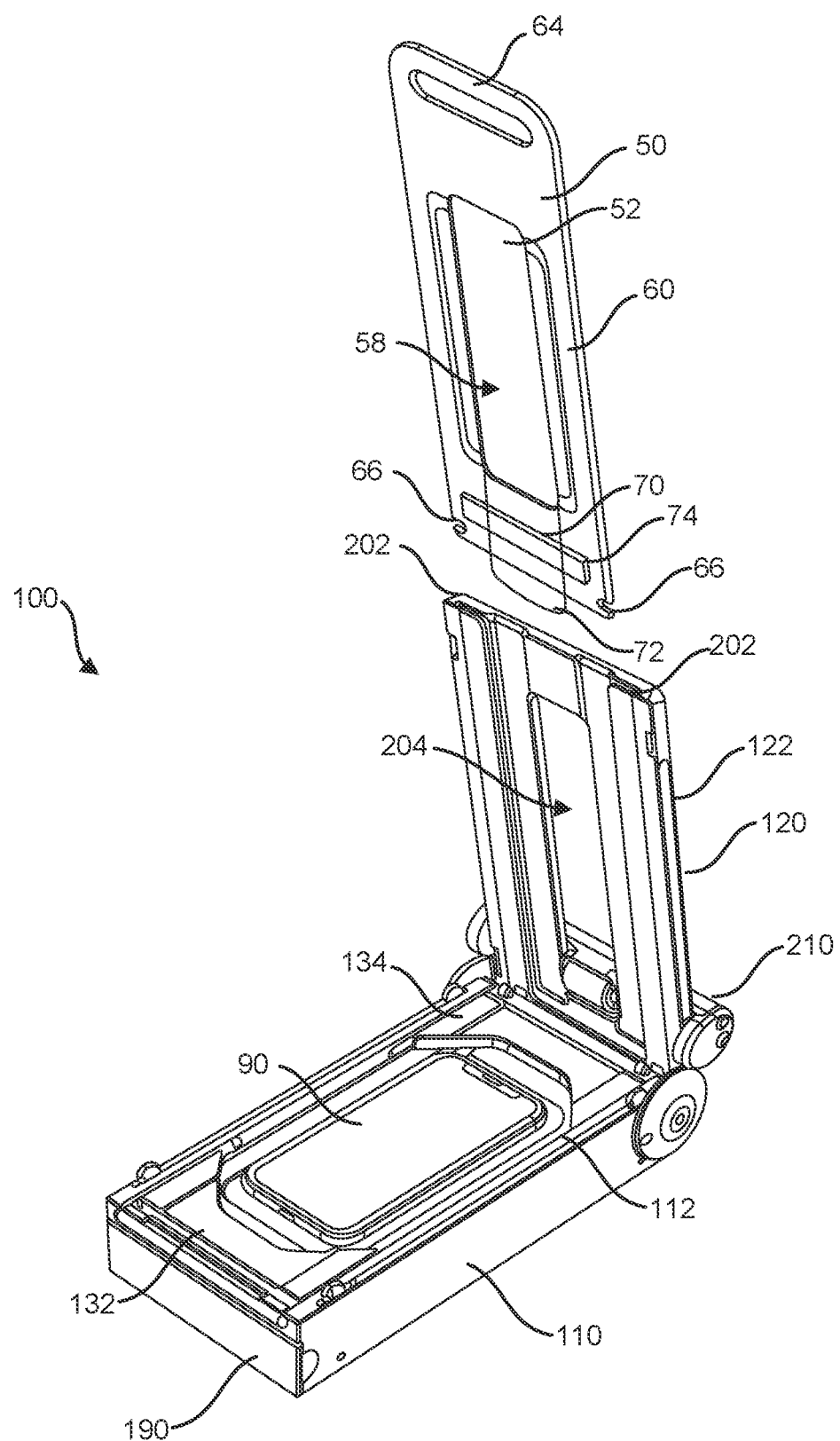
FIG. 13 illustrates the cartridge assembly of FIG. 9 being inserted in the apparatus of FIG. 8 with the lid in an open position.
Figure 14:
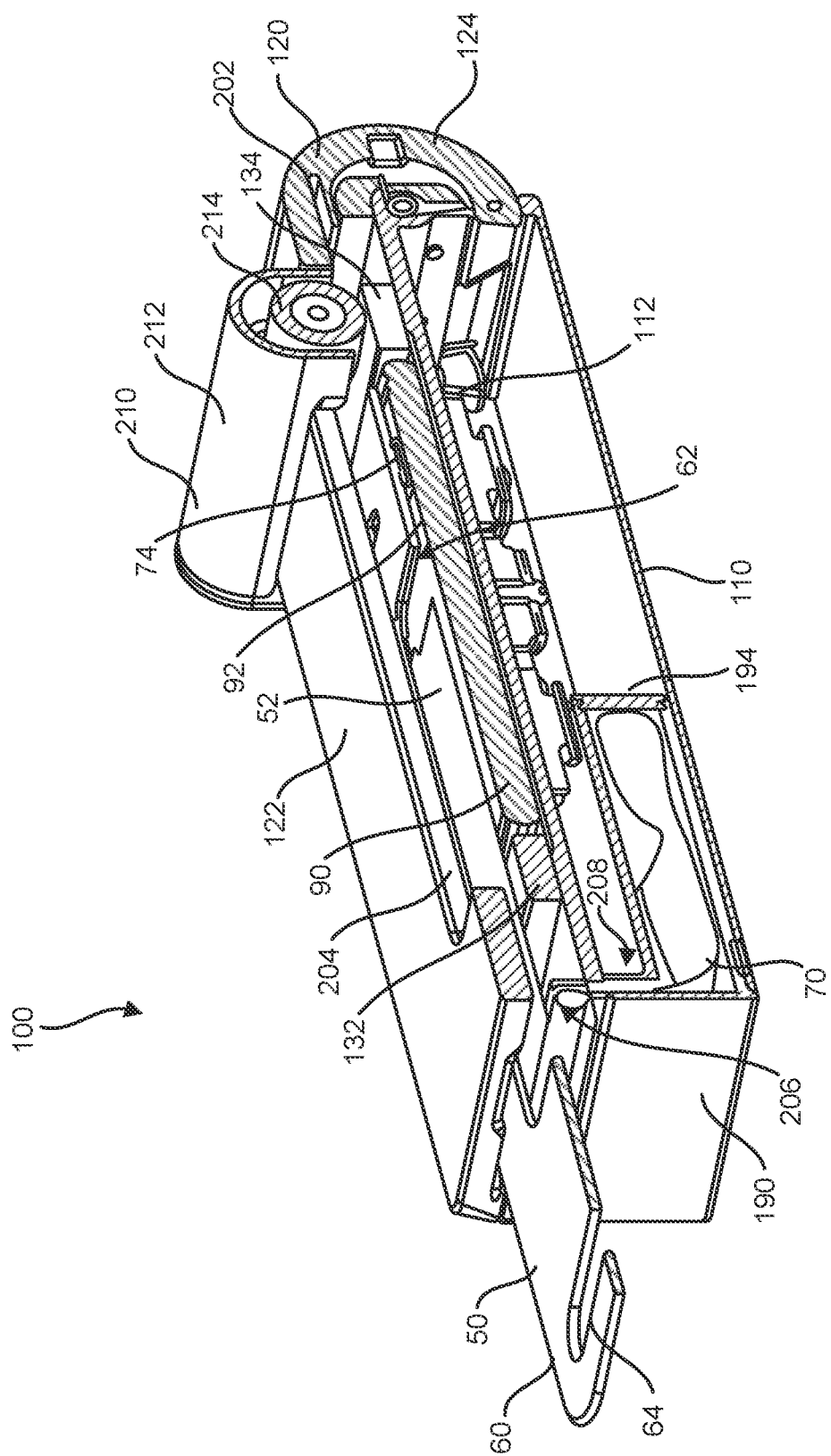
FIG. 14 illustrates a perspective sectional view of the cartridge of FIG. 9 being inserted in the apparats of FIG. 8 with the lid in a closed position.
Figure 15:
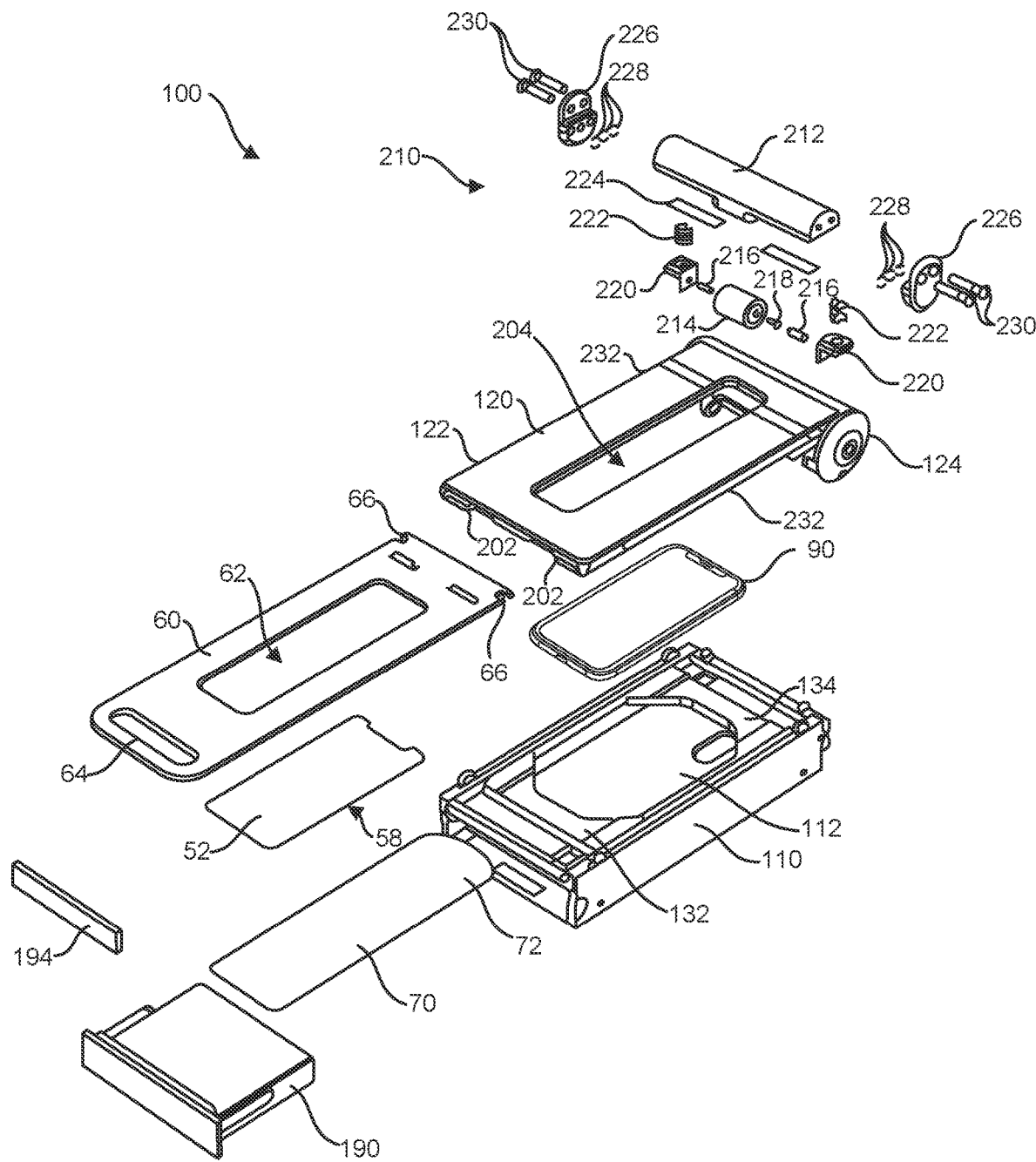
FIG. 15 illustrates an exploded view of the apparatus of FIG. 14.

Referring next to FIGS. 13-17, screen protector cartridge assembly 50 is illustrated being received by apparatus 100. FIG. 15 illustrates an exploded view of apparatus 100 and screen protector cartridge assembly 50. As illustrated in FIG. 13, in some embodiments, screen protector cartridge assembly 50 is received by apparatus 100 after the electronic device 90 has been aligned and/or positioned as illustrated in FIG. 8.

In some embodiments, screen protector cartridge assembly 50 is received within lid 120 of apparatus 100. In other embodiments, screen protector cartridge assembly 50 is received within base 110 of apparatus 100.

In some embodiments, such as the embodiment illustrated in FIG. 13, screen protector cartridge assembly 50 is inserted into lid 120 of apparatus 100 while lid 120 is in an open position. In this embodiment, removable liner 70 is first removed, exposing the adhesive 58 on the bottom surface of screen protector 52. In FIG. 13, the edges of cartridge board 60 are inserted into corresponding grooves 202 formed in first portion 122 of lid 120. Cartridge board 60 is moved along grooves 202 until slots 66 and recesses 68 (not shown in FIG. 13) are received in corresponding features in lid 120, indicating to the user that screen protector cartridge assembly 50 is properly aligned and positioned. The user then closes lid 120, resulting in the configuration illustrated in FIGS. 16 and 17. Aperture 62 of cartridge board 60 is at least partially aligned with a corresponding aperture 204 in lid 120 to provide access to screen protector 52 through aperture 62 and aperture 204.

Figure 17:
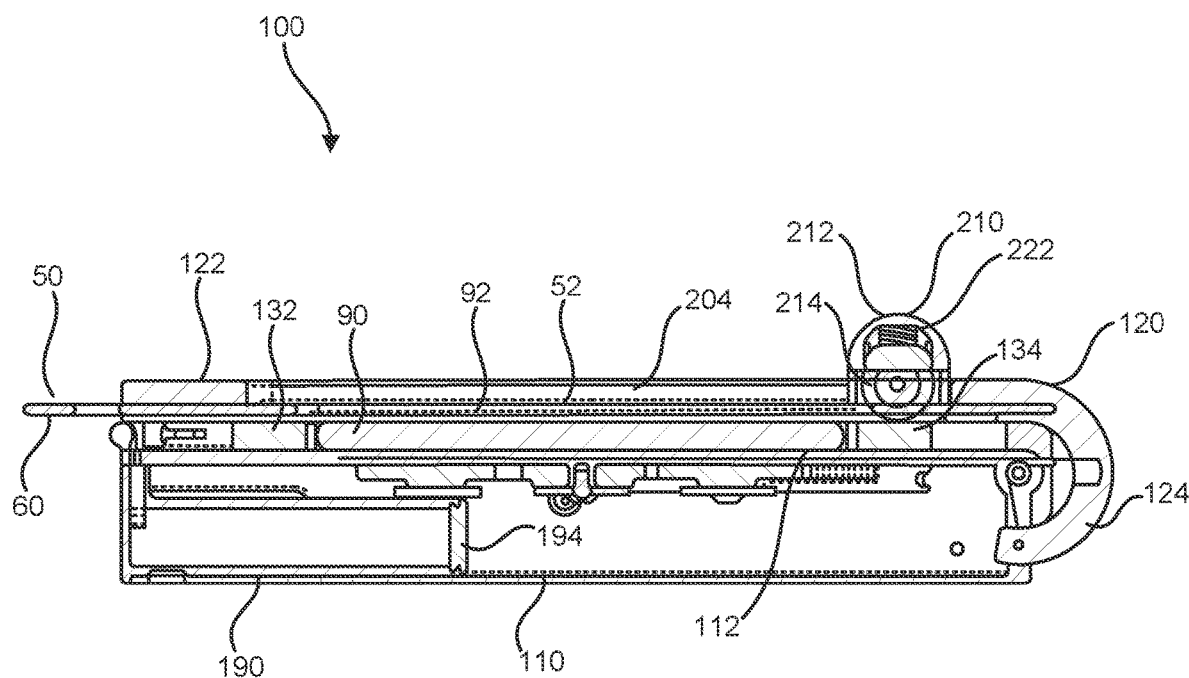
FIG. 17 illustrates a side sectional view of the apparatus of FIG. 16 with the gantry in the back position.

In other embodiments, such as the embodiment illustrated in FIG. 14, screen protector cartridge assembly 50 is inserted into lid 120 of apparatus 100 while lid 120 is in a closed position. In this embodiment, leading edge 72 of bottom removable liner 70 is fed into slot 206 in base 110 and the edges of cartridge board 60 are inserted into corresponding grooves 202 formed in first portion 122 of lid 120. Cartridge board 60 is moved along grooves 202 until slots 66 and recesses 68 (not shown in FIG. 14) are received in corresponding features in lid 120, indicating to the user that screen protector cartridge assembly 50 is properly aligned and positioned. In some embodiments, wiper 74 cleans the display 92 of electronic device 90 supported on platform 112 of apparatus 100 as cartridge board 60 is moved along grooves 202. At the same time, bottom removable liner 70 is forced through slot 206 and channel 208 to be deposited into removable tray 190. In some embodiments, the movement of cartridge board 60 into lid 120 simultaneously removes the bottom removable liner 70 from screen protector 52, thereby exposing adhesive 58 on the bottom surface of screen protector 52. In some embodiments, removable tray 190 is sized to receive multiple bottom removable liners 70 and hold them for later disposal. Once the screen protector cartridge assembly 50 is properly aligned and positioned, the apparatus 100 is configured as illustrated in FIGS. 16 and 17. Aperture 62 of cartridge board 60 is at least partially aligned with a corresponding aperture 204 in lid 120 to provide access to screen protector 52 through aperture 62 and aperture 204.

In some embodiments, apparatus 100 includes a gantry 210 for affixing the screen protector 52 to the display 92 of electronic device 90. In the exemplary embodiment illustrated in FIGS. 16 and 17, the gantry 210 is illustrated in a first position prior to contacting the screen protector 52.

Figure 18:
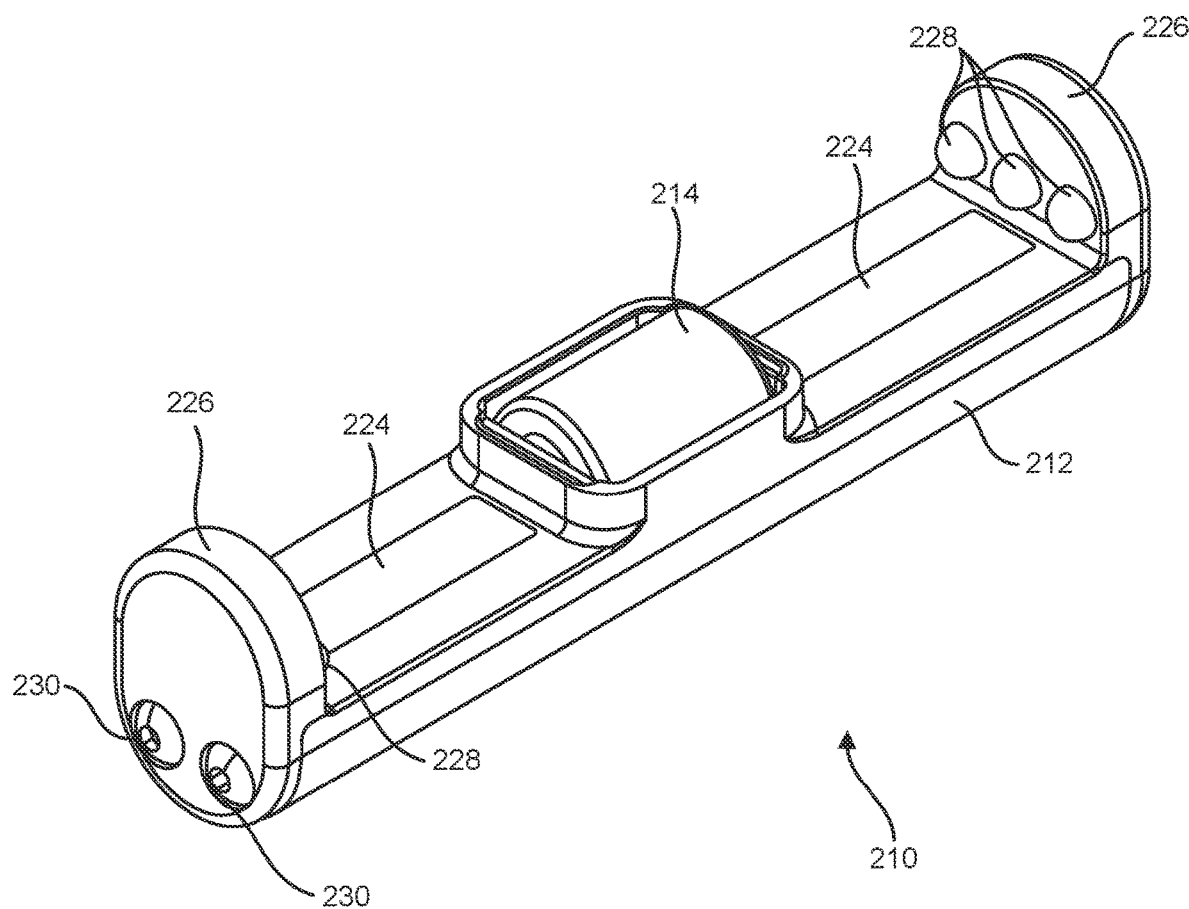
FIG. 18 illustrates a bottom perspective view of an exemplary gantry of the apparatus of FIG. 16.
Figure 19:
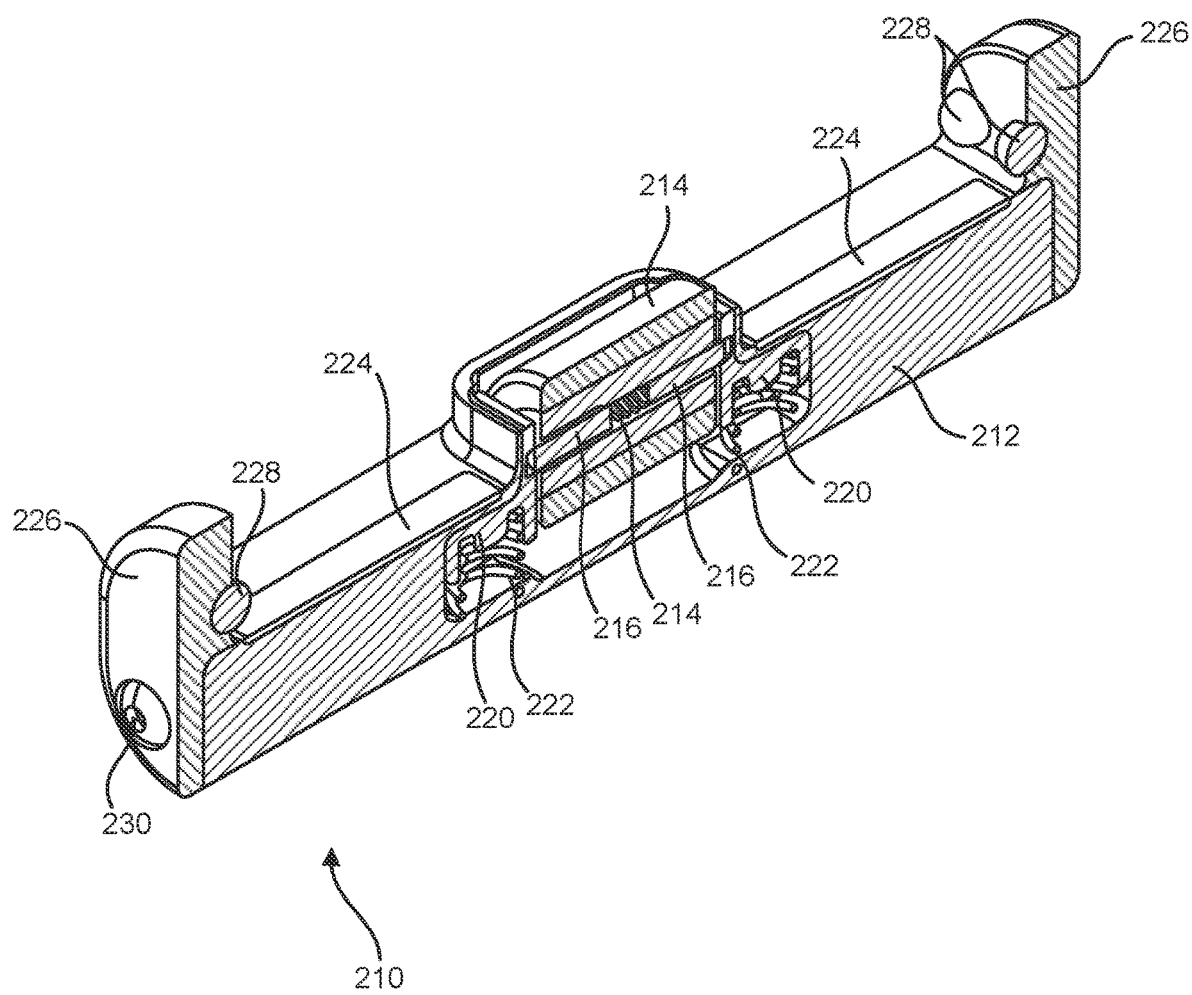
FIG. 19 illustrates a section view of the gantry of FIG. 18.

A bottom view of an exemplary gantry 210 is illustrated in FIGS. 18 and 19. Gantry 210 illustratively includes a handle 212 for moving gantry 210 with respect to lid 120, base 110, screen protector 52, and electronic device 90 between the first position illustrated in FIGS. 16 and 17 and the second position illustrated in FIGS. 21 and 22.

Gantry 210 further includes roller 214. Roller 214 rotates about connector 214 and axels 216. In some embodiments, roller 214 is sized to fit in aperture 204 of lid 120 and aperture 62 of cartridge board 60. Roller 214 is configured to contact the screen protector 52 to affix the screen protector 52 to the display 92 of electronic device 90 positioned on platform 112 as the gantry moves from the first position illustrated in FIGS. 16 and 17 to the second position illustrated in FIGS. 21 and 22.

In some embodiments, axels 216 are connected to bases 220 received within handle 212. A downward force is applied to bases 220 and attached roller 214 by a biasing element, such as one or more springs 222. In some embodiments, bases 220 are at least partially covered by one or more covers 224.

In some embodiments, each end 226 of gantry 210 includes one or more projections 228. In some embodiments, each of ends 226 is secured to gantry 210 with one or more fasteners 230. Projections 228 are received within corresponding grooves 232 in first portion 122 of lid 120. Projections 228 allow gantry 210 to slide with respect to lid 120 between the first position and the second position, but resist gantry 210 from moving vertically with respect to lid 120. In some embodiments, projections 228 are ball bearings able to rotate within end 226.

Figure 20:
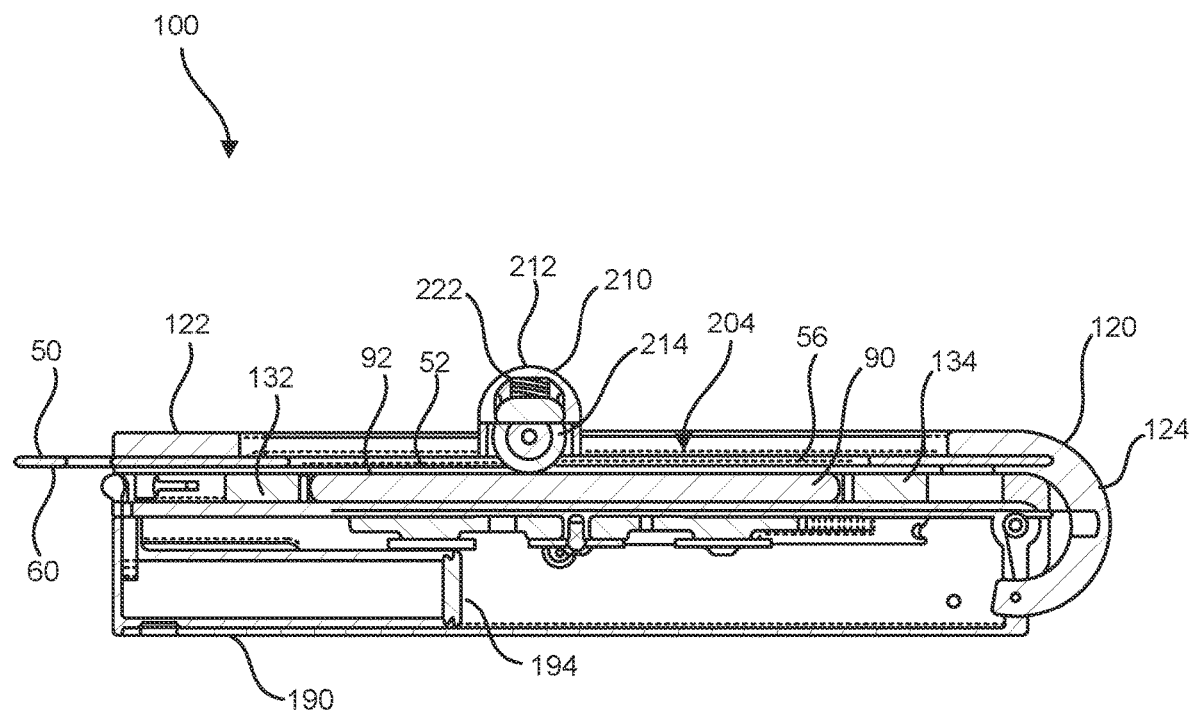
FIG. 20 illustrates a side sectional view of the apparatus of FIG. 16 with the gantry in an intermediate position.
Figure 21:
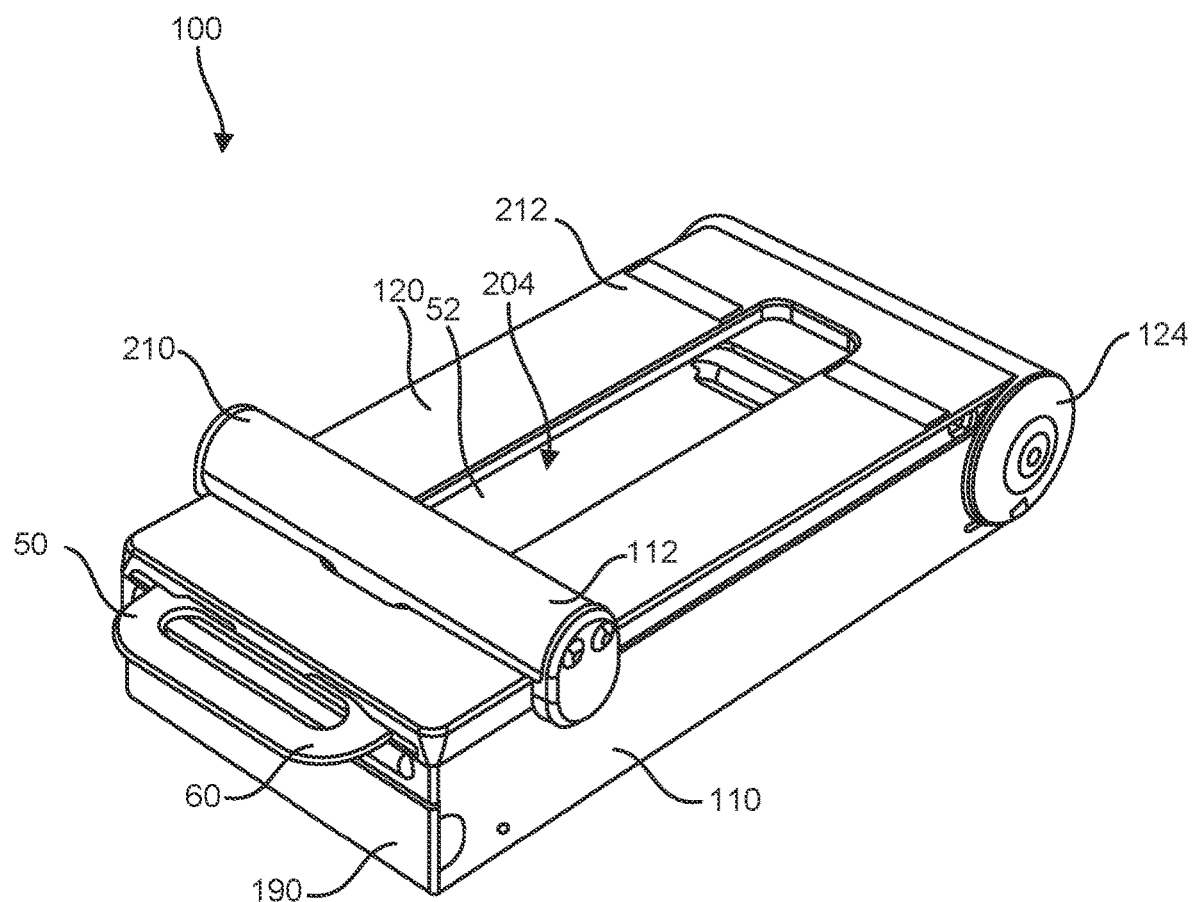
FIG. 21 illustrates the apparatus of FIG. 16 with the gantry in the forward position.
Figure 22:
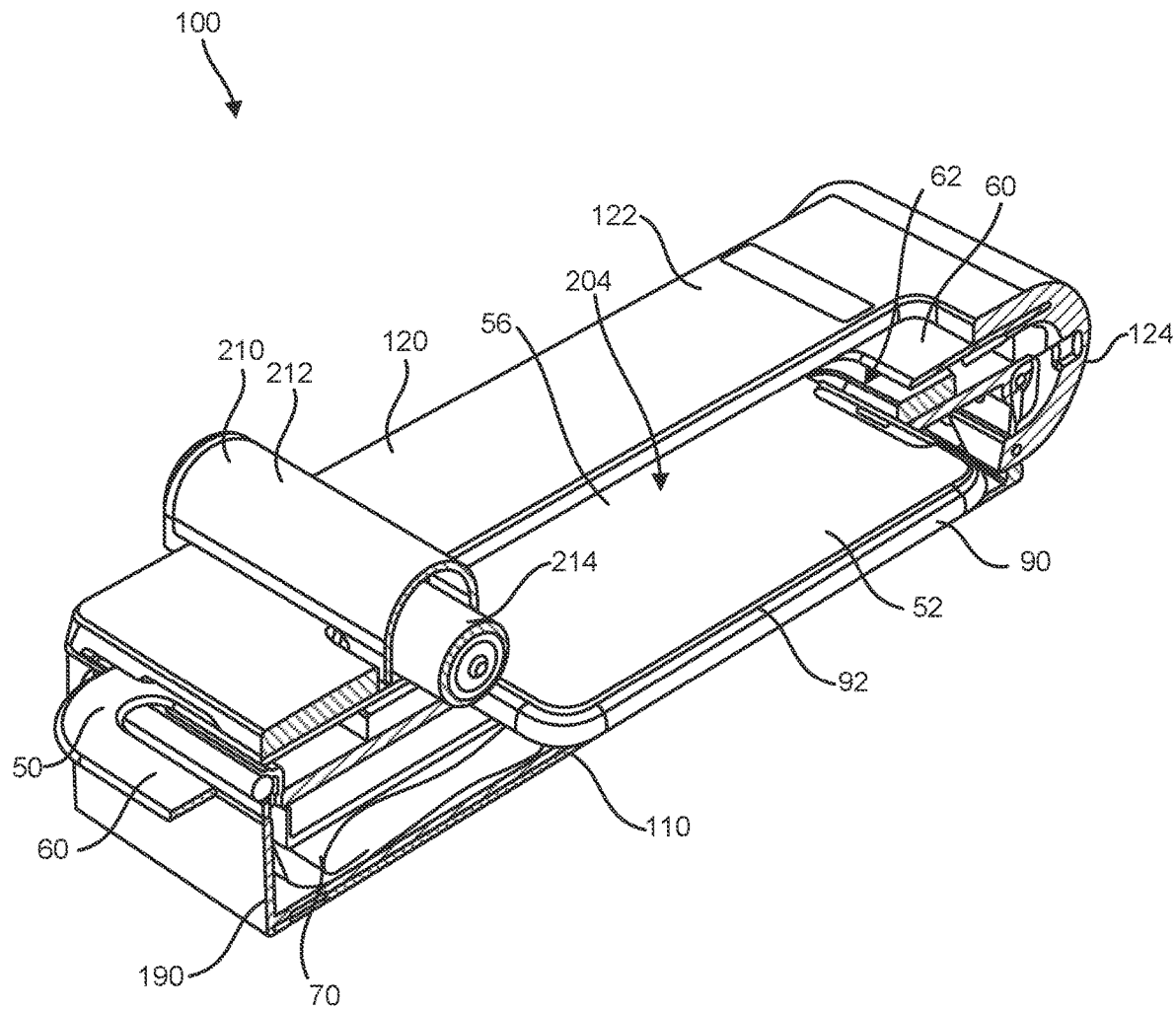
FIG. 22 illustrates a perspective sectional view of the apparatus of FIG. 16 with the gantry in the forward position.

Gantry 120 is moved from the first position illustrated in FIGS. 16 and 17 towards the second position illustrated in FIGS. 21 and 22. As gantry 120 is moved towards the second position, the roller 214 moves within aperture 204 of lid 120 and aperture 62 of cartridge board 60 and contacts a front side of screen protector 52, either directly or through a front removable top liner 56 releasably adhered to the front side of screen protector 52. The downward force from springs 222 results in a downward force from roller 214 onto the screen protector 52, releasing the screen protector from the cartridge board 60 and contacting the adhesive 58 on the back side of screen protector 52 to display 92 of electronic device 90, thereby affixing the screen protector 52 to display 92. FIG. 20 illustrates the gantry 210 at a position intermediate the first position and the second position with the roller 214 affixing the screen protector 52 to electronic device 90.

Referring next to FIGS. 21 and 22, the gantry 120 is illustrated in the second position. The gantry 120 has traversed the entire path from the first position illustrated in FIGS. 16 and 17, resulting in the roller 214 contacting the screen protector 52 along its entire length and affixing it to the electronic device 90. Without wishing to be held to any particular theory, it is believed that applying a screen protector with a force traversing along its length from a first end to a second end, such as described herein, results in a better application of the screen protector 52 and fewer trapped air bubbles, possibly due to the air bubbles being pushed out in the direction of travel of the roller 214 as the screen protector 52 is applied.

Figure 23:
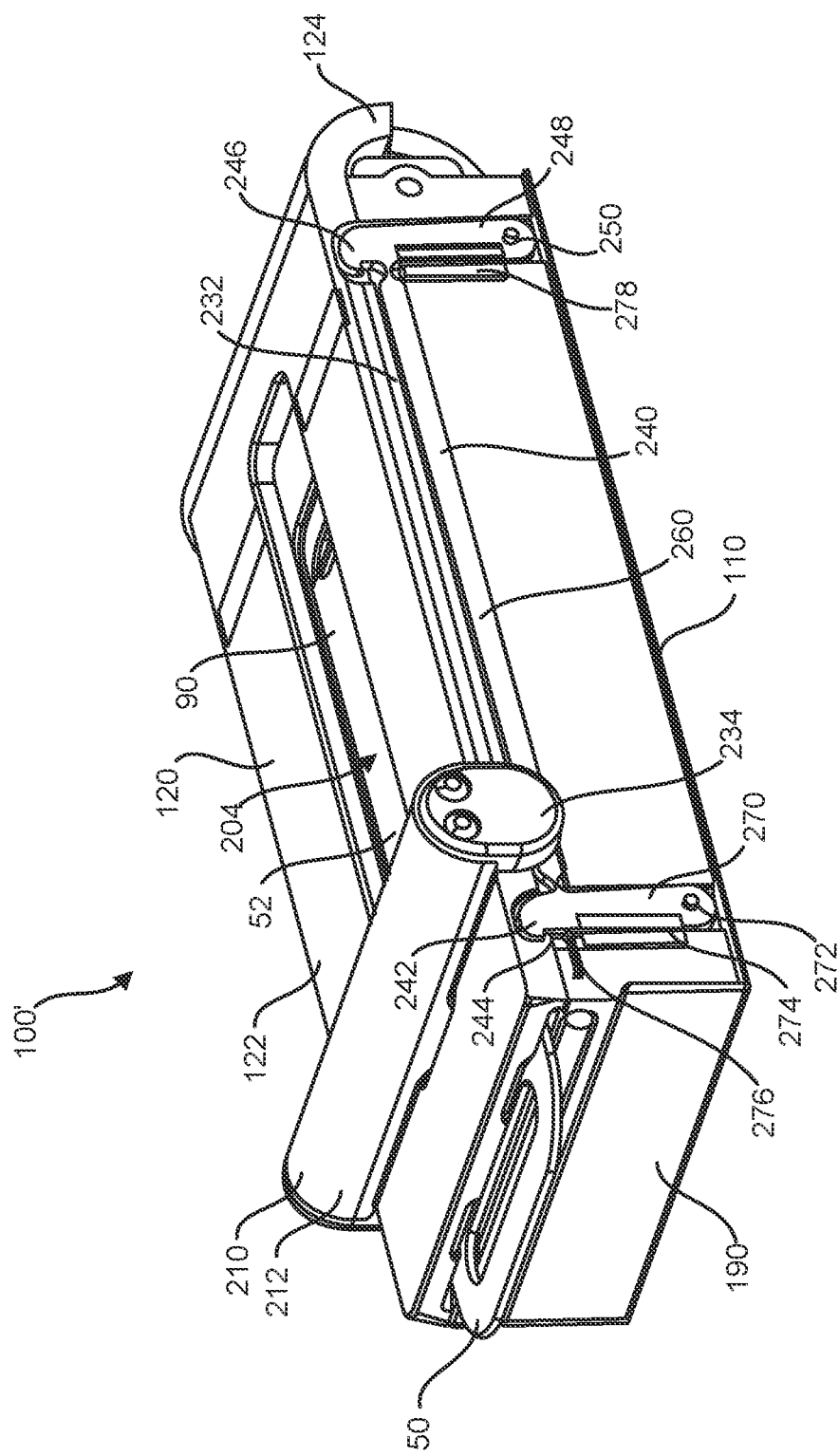
FIG. 23 illustrates an alternative embodiment of the apparatus of FIG. 16 with the gantry in the forward position.
Figure 24:
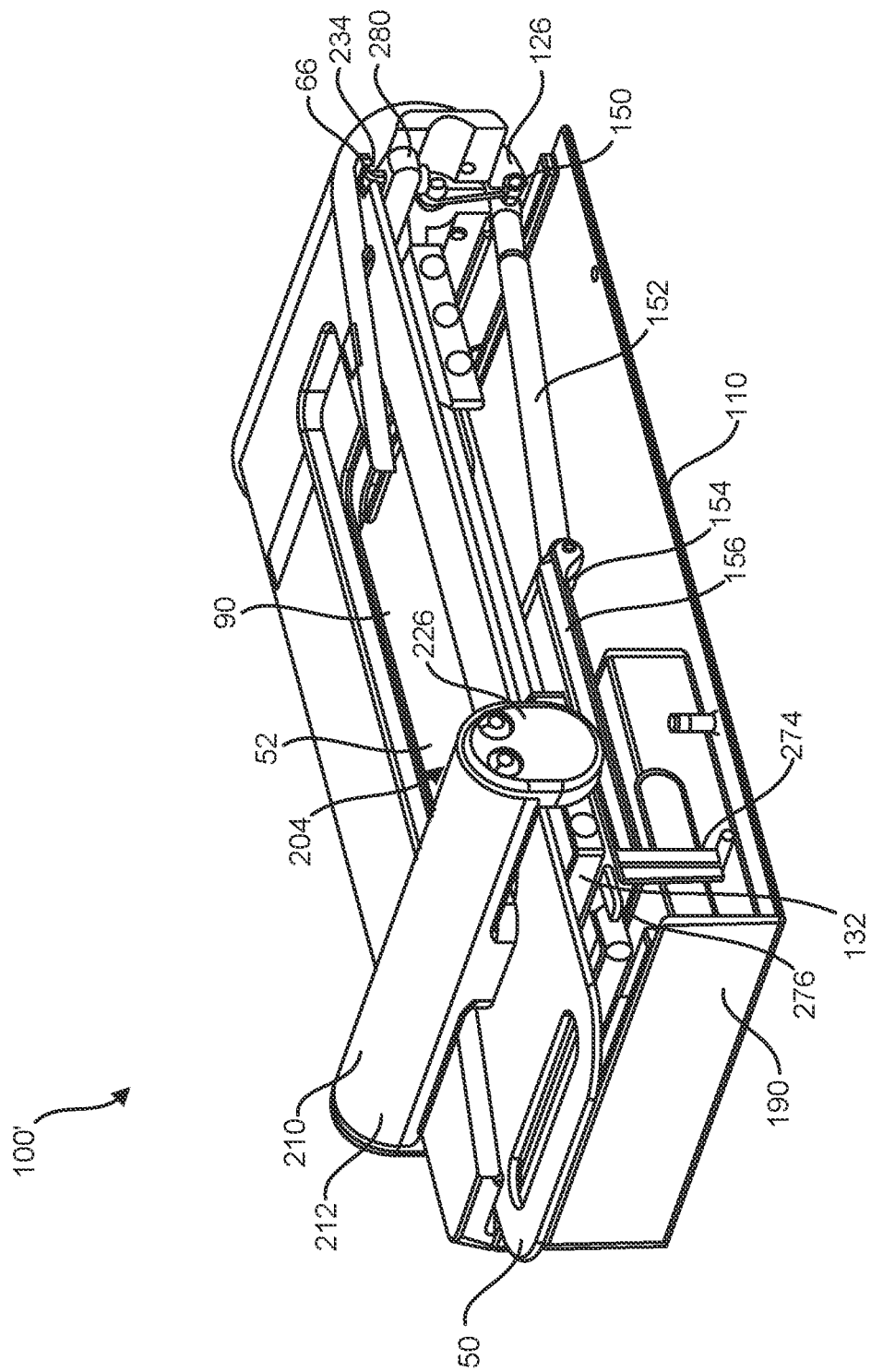
FIG. 24 illustrates a perspective sectional view of the apparatus of FIG. 23.

Referring next to FIGS. 23 and 24, another exemplary apparatus 100' is illustrated. In some embodiments, the features of apparatus 100' may be incorporated in apparatus 100. Apparatus 100' includes release mechanism 240 for releasing latch 242, allowing lid 120 to open relative to base 110. Latch 242 is configured to releasably engage projection 244 on lid 120, thereby holding lid 120 in the second closed position as illustrated in FIG. 23. Latch 242 is configured to move to a second position to disengage projection 244, thereby allowing lid 120 to return to the first open position as illustrated in FIG. 25.

Figure 25:
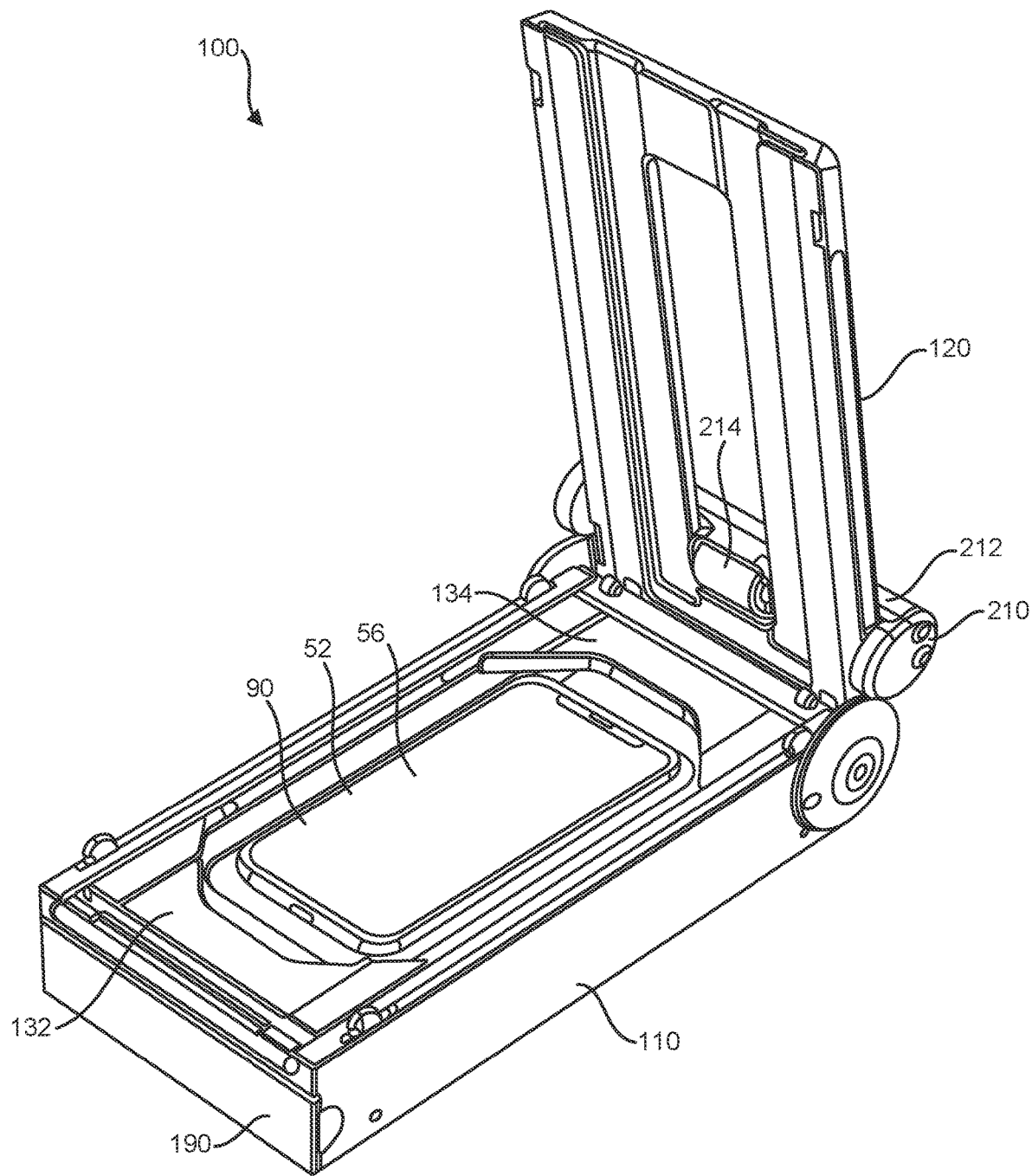
FIG. 25 illustrates the apparatus of FIG. 16 with the lid in an open position.

In some embodiments, moving the gantry 210 from the first position to the second position illustrated in FIGS. 23 and 24 results in a portion of gantry 210, such as end 226, contacting a portion of release mechanism 240 proximate groove 232 to move latch 242 from the engaged position to the disengaged position, thereby allowing lid 120 to return to the first open position as illustrated in FIG. 25.

In some embodiments, moving the gantry 210 from the second position illustrated in FIGS. 23 and 24 back to the first position illustrated in FIG. 25 results in a portion of gantry 210, such as end 226 contacting end 246 of first beam 248 of release mechanism 240. A second end 250 of first beam 248 is rotatably attached to base 210. Movement of first beam 248 about second end 250 is transmitted via connecting beam 260 to second beam 270. Second beam 270 is rotatably attached to base 210 at end 272. Movement of second beam 270 results in latch 242 disengaging from projection 244 on lid 120, thereby allowing lid 120 to return to the first open position as illustrated in FIG. 25.

In some embodiments, second beam 270 is rigidly attached to extension 274, such that movement of second beam 270 is transferred through extension 274 to release latch 276. In some embodiments, releasing latch 276 results in lid 120 disengaging from base 120. In other embodiments, releasing latch 276 results in cartridge board 60 disengaging from apparatus 100' so that the empty cartridge board 60 can be removed from apparatus 100'.

In some embodiments, first beam 248 includes extension 278. In some embodiments, movement of first beam 248 results in a portion of first beam 248, such as end 246 and/or extension 278, contacting release bar 280. In some embodiments, contacting release bar 280 results in lid 120 disengaging from base 120. In other embodiments, contacting release bar 280 results in slots 66 disengaging releasable tabs 234, thereby resulting in cartridge board 60 disengaging from apparatus 100' so that the empty cartridge board 60 can be removed from apparatus 100'.

Referring next to FIG. 25, apparatus 100 is illustrated with the lid 120 in the open position. In some embodiments the cartridge board 60 is removed and lid 120 is moved back to an open first position as illustrated, and the electronic device 90 with affixed screen protector 52 can be removed by the user. In some embodiments, a removable top liner 56 is removed from screen protector 52 once the lid 120 is opened as illustrated in FIG. 25. The removable tray 190 may also be removed and the removable film 70 therein disposed of.

In another example, a screen protector cartridge assembly comprises a screen protector including an adhesive positioned on a bottom side where the screen protector is configured to protect a display of an electronic device. The screen protector cartridge assembly further comprises a cartridge board releasably attached to the screen protector where the cartridge board includes an aperture providing access to the screen protector. Finally, the screen protector cartridge assembly further comprises a bottom release liner covering the adhesive and releasably attached to the bottom surface of the screen protector.

The elements, components, and steps described herein are meant to exemplify some types of possibilities. In no way should the aforementioned examples limit the scope of the invention, as they are only exemplary embodiments. Moreover, the figures provided are meant to illustrate certain features of the embodiments. Unless otherwise noted, they are not provided to scale.

The phrases "in some embodiments," "according to some embodiments," "in the embodiments shown," "in other embodiments," "in some examples," "in other examples," "in some cases," "in some situations," "in one configuration," " "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The above figures may depict exemplary configurations for an apparatus of the disclosure, which is done to aid in understanding the features and functionality that can be included in the enclosures described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus, the breadth and scope of the present disclosure, especially in any following claims, should not be limited by any of the above-described exemplary embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. An apparatus for assisting in affixing a screen protector to a display of an electronic device, the apparatus comprising:
    a base including a platform configured to support the electronic device when the electronic device is placed in the apparatus, wherein the base includes a positioning mechanism which is configured for aligning the supported electronic device on the platform; and
    a lid configured to cover at least a portion of the base and the supported electronic device, the lid including an aperture, wherein the positioning mechanism is operably connected to the lid through one or more mechanical members such that closing the lid transfers movement of the lid to the positioning mechanism through the one or more mechanical members to move the positioning mechanism to align the supported electronic device on the platform.

2. The apparatus of claim 1 wherein the positioning mechanism includes a first positioning jaw movable from a first position to a second position, wherein the first positioning jaw includes a first surface configured to contact a first corner of the supported electronic device at a first angle and a second surface configured to contact a second corner of the supported electronic device at a second angle that is different than the first angle when the first positioning jaw moves from the first position to the second position, wherein the first positioning jaw is configured to align the supported electronic device on the platform when in the second position.

3. The apparatus of claim 2 wherein the one or more mechanical members includes a shaft configured to transfer the movement of the lid to the first positioning jaw of the positioning mechanism.

4. The apparatus of claim 3 further comprising a spring attached to the shaft, wherein the spring absorbs a portion of the movement of the shaft.

5. The apparatus of claim 1 further including a gantry including a roller configured to contact the screen protector through the aperture in the lid, the gantry being movably attached to the lid and configured to affix the screen protector to the supported electronic device when the gantry moves from a first position to a second position, wherein the lid is releasably secured to the base by a latch.

6. The apparatus of claim 5 wherein moving the gantry from the first position to the second position releases the latch.

7. The apparatus of claim 5 wherein the gantry is slidably movable with respect to the lid.

8. The apparatus of claim 5 wherein the gantry includes a handle and one or more springs, wherein the gantry is configured to apply a downward pressure on the screen protector from the springs to affix the screen protector to the supported electronic device.

9. The apparatus of claim 5 wherein the gantry is configured to contact the screen protector through the aperture in the lid and through an aperture in a cartridge board releasably affixed to the screen protector.

10. The apparatus of claim 9 wherein the lid includes one or more grooves configured to receive the cartridge board and the screen protector.

11. The apparatus of claim 10 wherein the base is configured to remove a removable liner from a surface of the screen protector as the cartridge board is received by the lid.

12. The apparatus of claim 11 wherein the base includes a removable tray for storing the removable liner after it is removed from the surface of the screen protector.

13. An apparatus for use when installing a screen protector on a display of a smartphone, the apparatus comprising:
a base including a platform adapted to support and align the smartphone when the smartphone is placed on the platform of the base, wherein the base includes a positioning mechanism adapted for aligning the smartphone on the platform of the apparatus; and
a top portion adapted to cover at least a portion of the base and the supported smartphone, the top portion including an aperture, wherein the positioning mechanism is operably linked to the top portion such that closing the top portion transfers movement of the top portion to the positioning mechanism to align the smartphone on the platform.

14. The apparatus of claim 13 further including a gantry including a roller adapted to contact the screen protector through the aperture in the top portion, wherein the gantry is movably attached to the top portion and adapted to affix the screen protector to the supported smartphone when the gantry moves from a first position to a second position.

15. The apparatus of claim 14 wherein the top portion is releasably secured to the base by a latch.

16. The apparatus of claim 15 wherein the gantry is adapted to release the latch when the gantry is moved back to the first position after being moved from the first position to the second position.

17. The apparatus of claim 14 wherein the gantry is slidably movable relative to the top portion.

18. The apparatus of claim 14 wherein the gantry includes a handle and one or more springs, wherein the springs are adapted to apply a downward pressure on the screen protector through the gantry to affix the screen protector to the smartphone.

19. The apparatus of claim 14 wherein the gantry is adapted to contact the screen protector through the aperture in the top portion and through an aperture in a cartridge board releasably affixed to the screen protector.

* * * * *